(12) United States Patent
Arias Vidal et al.

(10) Patent No.: US 7,266,261 B2
(45) Date of Patent: Sep. 4, 2007

(54) FIBER OPTICS DIFFERENTIAL PRESSURE TRANSDUCER

(75) Inventors: Jose Luiz Arias Vidal, Rio de Janeiro (BR); Manoel Feliciano da Silva, Jr., Rio de Janeiro (BR); Ricardo Munoz Freitas, Rio de Janeiro (BR); Arthur Martins Barbosa Braga, Rio de Janeiro (BR); Luiz Carlos Guedes Valente, Rio de Janeiro (BR); Roberth Waldo Angulo Llerna, Rio de Janerio (BR)

(73) Assignee: Petroleo Brasileiro S.A.-Petrobras (BR)

( * ) Notice: Subject to any disclaimer, the term of this patent is extended or adjusted under 35 U.S.C. 154(b) by 193 days.

(21) Appl. No.: 11/222,237

(22) Filed: Sep. 9, 2005

(65) Prior Publication Data

US 2006/0062510 A1 Mar. 23, 2006

(30) Foreign Application Priority Data

Sep. 9, 2004 (BR) .................................... 0403786

(51) Int. Cl.
*G02B 6/00* (2006.01)
*G01L 9/00* (2006.01)

(52) U.S. Cl. ............................ 385/13; 385/12; 385/88; 385/92; 385/94; 250/227.14; 250/231.1; 250/229; 250/231.19; 73/705

(58) Field of Classification Search .................. 385/12, 385/13, 14, 15, 88, 89, 92, 93, 94; 250/227.11, 250/227.14, 231.1, 229, 231.19; 73/705, 73/708, 800

See application file for complete search history.

(56) References Cited

U.S. PATENT DOCUMENTS

| 4,899,046 | A | | 2/1990 | Wright et al. ............... 250/227 |
|---|---|---|---|---|
| 6,016,702 | A | * | 1/2000 | Maron .......................... 73/705 |
| 6,278,811 | B1 | * | 8/2001 | Hay et al. ...................... 385/13 |
| 6,422,084 | B1 | * | 7/2002 | Fernald et al. ................ 73/705 |
| 6,490,931 | B1 | * | 12/2002 | Fernald et al. ................ 73/705 |
| 6,563,970 | B1 | | 5/2003 | Bohnert et al. ............. 250/227 |
| 6,597,821 | B1 | | 7/2003 | Bohnert et al. ............... 385/12 |
| 6,820,489 | B2 | * | 11/2004 | Fernald et al. ................ 73/705 |
| 2006/0062510 | A1 | * | 3/2006 | Arias Vidal et al. .......... 385/13 |
| 2007/0003207 | A1 | * | 1/2007 | Dunphy et al. ............. 385/138 |

FOREIGN PATENT DOCUMENTS

| WO | WO 00/33048 | 6/2000 | ............... 385/12 X |
|---|---|---|---|
| WO | WO 01/14843 | 3/2001 | ............... 385/12 X |

\* cited by examiner

*Primary Examiner*—Brian M. Healy
(74) *Attorney, Agent, or Firm*—Nixon & Vanderhye PC

(57) ABSTRACT

A fiber optics differential pressure transducer (100, 200, 300, 400) containing Bragg networks (118), said transducer being used to measure the differential pressure in a Venturi installed inside a pipe (1), through which a fluid like oil is displaced. The transducer comprises a body (110, 230, 360, 410) of different geometries and a diaphragm (2), at least one Bragg network (118) being attached on each of the surfaces of the same. The diaphragm (2) is placed parallel or transversal to the transducer's body (100, 200, 300, 400). The transducer (200) is isolated from the process fluid by flexible mechanical seals (201) which transmit the pressure up to surfaces of the diaphragm (2). The transducer (300, 400) is provided with two relief microvalves for the purpose of protecting the sensor [diaphragms (2)] in overpressure events.

35 Claims, 19 Drawing Sheets

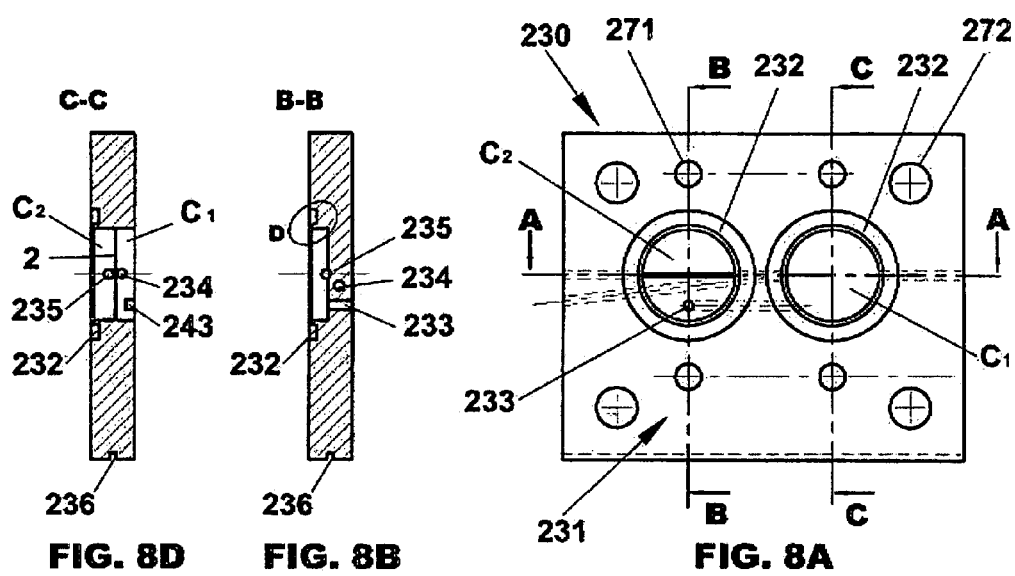
FIG. 8C
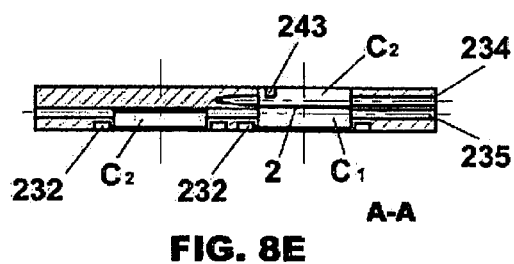

DETALHE B
ESC.: 2:1

DETALHE C
ESC.: 6:1

FIBER OPTICS DIFFERENTIAL PRESSURE TRANSDUCER

This application is based upon, claims the benefit of, priority of, and incorporates by reference, the contents of Brazilian Patent Application No. PI 0403786-3 filed Sep. 9, 2004.

FIELD OF THE INVENTION

This invention refers to a Fiber Optics Differential Pressure Transducer to be used in a flow measurer (Venturini's type) of the fluid's production or injection inside oil wells. The differential pressure transducer is made of fiber optics with at least one Bragg network.

BACKGROUND OF THE INVENTION

Among the several types of flow measurers, the flow measurer based on differential pressure is one of the most well-known. One of the elements that makes part of this kind of measurer is a device through which a pressure differential is produced (Venturini; hole board, nozzle); the other important element is the pressure transducer, that is liable for recording the pressure variation (charge loss) produced when the fluid flows through a Venturini.

The patents' literature presents several documents on this subject. Patent number U.S. Pat. No. 4,899,046 instructs a sensor in which a sealed cavity is formed of two half cavities (20,22) with flanges that allow they are united. The two half cavities provide form to the chambers (26,28), that are separated by a diaphragm (24). The area surrounding the diaphragm is sealed by the connection of the same two half cavities. Full of pressure (30, 32), they allow the communication of the liquid with the chambers, for each chamber, whose pressure difference must be measured. Na optical guide (34) is attached to the diaphregm so that the pressure differences are transmitted to it. A source sents a light (40) to an optical-electronic converser (42) attached to a signal processor circuit (44) and to an indicator (45). In the proportion the diaphragm deforms itself under pressure, the light through the guide shall become low.

The International publication WO9944026 (U.S. Pat. No. 6,563,970) instructs Bragg Network for sensing the temperature and pressure in oil wells. The novelty in this invention is that the supports (5a, 5b) form a pressurized body (7a, 7b) which converts the surrounding pressure of a medium (11) into expansion or longitudinal compression of the pressure sensor fiber (3). The sensor (1) comprises an isolated a pressure-isolated chamber with the entrance of a fiber (16) sealed by its own pressure force. A fiber detects the pressure and the temperature. The fiber of the temperature sector (19) includes a FBG (20). The pressurized body comprises a pressure cylinder (7a, 7b), whose cavity (9) presents an opening (118), and the end surfaces (8a, 8b) are connected to the fiber holders (6a, 6b). The first support (5a) is a (5a) cylinder (7a) that is expandable due to the internal pressure; the second one is an external cylinder (7b) isolated from the surroundings (11); both are attached to the transducer's wall (14) and are encapsulated by its packing. Alternatively, in a similar assembly, the external cylinder is compressed by the external pressure. It is described additional variations based on similar principles. Several transducers with different Bragg wave lengths are attached by optics fiber for a large light source range (40) to a detector unit. This comprises a multiplexer and a wave length detector connected to the electronic instrumentation. The pressurized body is full of silicon oil and the pressure-isolated chamber has low pressure or vacuum gas. According to its inventors, this sensor could be used to measure the pressure and the temperature in oil wells above 100 MPa (14500 psi) and up to 170° C.

In the sensor described in the International Publication WO 0114843-A1, it is employed at least two Bragg networks. In this pressure sensor, the use of two networks allows the set off of temperature variations and possible effects over the wave length of the FBGs due to the contact with gases, possibly the $H_2$. The pressure transference element converts the pressure of a medium into na expansion or longitudinal compression of at least one section of fiber optics with one Bragg network. The sensor which is the object of the invention is used to measure high pressures, i.e., within the 100 Moa (14500 psi), especially in natural gas or oil wells.

The International Publication WO 0033048-A2 proposes a pressure sensor based on fiber optics using Bragg networks, also aiming at well applications. It is used one fiber optics with two FBGs. The fiber section which contains one of the Bragg network is fixed with an epoxi-based glue to a pressure detector. The elastic deformation of the detector is transmitted to the FBG along its longitudinal central line, so that mechanical restrictions corresponding to the deformation are developed in the FBG. The wave length which characterizes FBG's reflectiveness is modified according to the mechanical restrictions. Another FBG is put in the pressure detector to Record the environmental temperature. According to the writers, this sensor is suitable for high pressures and it may be used to measure the pressure in wells engines, combustion chambers and other environments.

The U.S. Pat. No. 6,597,821 patent defines a differential pressure sensor that uses a fiber laser and comprises a light source, supply fibers, a fiber laser formed by at least two reflectors at their ends, one detector and one analyser. The measuring principle is based on the induced pulsation by birefringence. The invention's application indicated by its inventors its the pressure measurement in oil fields.

The scientific literature reports an article written by Lim, J., Yang, Q. P., Jones, B. E., and Jackson, P. R, "DP Flow using Optical Fiber Bragg Grating," *Sensors and Actuators A*, vol. 92, pp 102-108, 2001, in which it is reported the development of an optical sensor with flow based on the differential pressure. The differential pressure sensor uses two Bragg networks in simple optics fiber that are mounted in both sides of the differential sensor diaphragm. The flow signalling is got by the modification of the wave lengths of the two FBGs. The sensor was tested with flow rates of 800 $cm^3/s$, with the temperature varying between 25° C. and 75° C., with maximum pressure differential of 0.08 Mpa (12 psi) produced by a hole board. It has been also tested with a monitoring system for the hydraulic valve, with fluid's rate above 6 $cm^3/s$, and at the pressure of 0.7 MPa (100 psi). The main difference between the differential transducer and the sensor proposed in this invention is that, contrary to the sensor reported by Lim et al, that employed FBGs in series with the support of na optical coupler, in the Requiring Party's sensor, the Bragg networks fixed in opposite sides of the diaphragm are positioned in series in the same optical fiber. This in series arrangement makes the integration easier (and reduces the losses by insertion) with the other sensors to the Bragg network of the intelligent optical completion system developed by the Requiring Party.

Thus, despite the development of the techniques, there is still the need of a Fiber Optics Differential Pressure Transducer in which the differential pressure produced by a Venturini type device acts directly over a diaphragm surface, that is inflected, being the deformation produced by the pressure action in the diaphragm surface related in line with the pressure applied and transformed into optical deformation using na FBG mounted on the center of the diaphragm in the side that is under stress, while a second FBG mounted on the diaphragm surface that is under compression is used to measure the temperature, providing a set off for the temperature, being such differential pressure transducer described and claimed in this application.

SUMMARY OF THE INVENTION

In general, within a modality, the invention refers to a Fiber Optics Differential Pressure Transducer with at least one Bragg Network (FBG), directed to measure the pressure differential in a pipeline through which a fluid displaces itself, and said transducer shall comprise the following:
a) a main body, with:
  i) a central hole;
  ii) symmetrically to the said hole, a lower level with a diaphragm in its center to fix it at least to one FBG, being the said body connected to
b) a cover, with lower levels with coinciding ends and with the same dimension of the central hole and the body's lower level, with a track to set a mechanical seal to seal the superior part of the transducer and, also, to make the said central hole communicate to one of the surfaces of the diaphragm submitted to pressure, being the other surface of the diaphragm in contact with another pressure plug, being the body and the cover assembled and fixed to a mandrel with the support of fixing devices through holes, and where the optical fiber with at least one FBG moves through holes in the transducer body in such a way that the said FBG is exactly over the surfaces of the diaphragm, and the fiber direction shall comprise to enter in the direction of the other diaphragm surface and, finally, get out, to be connected to another transducer or to the measuring system.

Thus, the invention provides a differential pressure transducer to measure the pressure fall in a line, being the transducer with Bragg networks fixed in the opposite sides of a diaphragm, which is an integrating part of the transducer's body, positioned in a series in the same optical fiber.

The invention also provides a differential pressure transducer to measure a pressure fall in order to measure the pressure fall in a pipeline, where the pressure difference acts directly over the surface of a diaphragm, which is then flexed, also provides a differential pressure transducer to measure the pressure fall in a pipeline, where the pressure difference directly acts over the diaphragm surface, which is, then, flexed, being the produced deformation linearly related to the pressure applied and transformed in optical deformation using the FBG mounted in the center of the diaphragm in one of the surfaces, at the side under stress.

The invention also provides a differential pressure transducer to measure a pressure fall in a pipeline with possibility of being used as a temperature transducer, using a second FBG, with a wave length different from the first one, that is in the other surface of the diaphragm, that is under compression, in order to define a set-off for the temperature.

BRIEF DESCRIPTION OF THE DRAWINGS

FIG. 1 attached hereto presents the differential pressure transducer and its arrangement near a pipeline where it is performed a pressure differential $\Delta P$.

FIG. 8A attached hereto shows the lower view of the transducer body (200). FIG. 8B shows a B-B cut through the C2 chamber of the transducer body. (200). FIG. 8C is a detail of FIG. 8B. FIG. 8D shows a C-C cut of the C1 chamber of the transducer body. (200). FIG. 8E shows an A-A longitudinal cut passing through chambers C1 and C2.

16E is a B-B cut passing through the center of the C1 and C2 chambers.

DETAILED DESCRIPTION OF THE PREFERRED MODALITIES

Figure 1C:
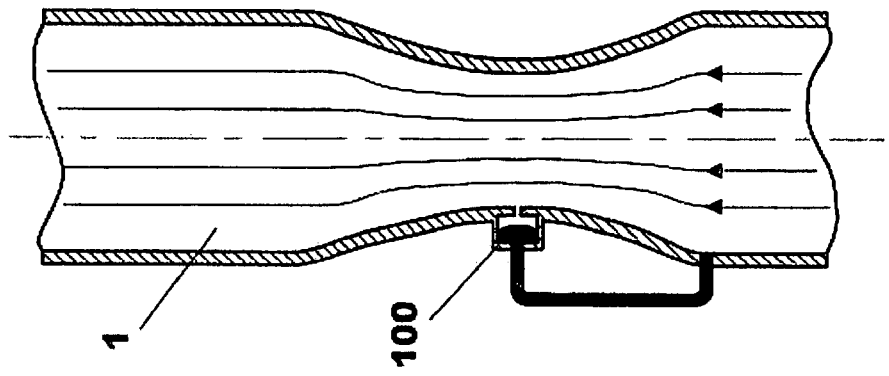
FIGS. 1A through 1C shows decreasing values for the $\Delta P$ value.

According to one modality, the invention comprises, thus, a Fiber Optics Differential Pressure Transducer with at least one Bragg network, directed to measure the pressure differential in a pipeline through which a fluid displaces itself, and said transducer shall comprise the following:

c) a main body, with:
  i) a central hole;
  ii) symmetrically to the said hole, a lower level with a diaphragm in its center to fix it at least to one FBG, being the said body connected to a cover, with lower levels with coinciding ends and with the same dimension of the central hole and the body's lower level, with a track to set a mechanical seal to seal the superior part of the transducer and, also, to make the said central hole communicate to one of the surfaces of the diaphragm submitted to pressure, being the other surface of the diaphragm in contact with another pressure plug, being the body and the cover assembled and fixed to a mandrel with the support of fixing devices through holes, and where the optical fiber with at least one FBG moves through holes in the transducer body in such a way that the said FBG is exactly over the surfaces of the diaphragm, and the fiber direction shall comprise to enter thorough a hole in one of the transducer's side, pass through the diaphragm, continue up to the central hole, round such hole in a spring made in the body's wall and enter again in the direction of the other surface of the diaphragm and, finally, exit to be connected to another transducer or to the measurement system.

At least one Bragg network is fixed to the diaphragm by any known form, such as through pasting, for example.

With advantage, the geometry and the form of measuring the pressure in the transducer (100, 200, 300, 400) allow the indistinctive use of any flow direction.

Also in the usual mode, the optics fiber with FBG is connected to na optical connector so that the light is directed to the FBG and, then, to a wavemeter (Measurer of the Optical Spectrum) or OSA (Optical Spectrum Analyzer). The system is completed with na optical coupler in order to make the optical connections between the light source, the sensor element and the wavemeter or OSA.

The working pressure interval of the invention's transducer is between 0.1 and 1 MPa.

The optical transducer of the invention uses the optical fiber technology with Bragg's Network (FBG).

The Bragg's network is projected in a way there is a periodical modulation in the refraction index of the optical fiber nucleus along the length of this fiber. The network reflects a range of wave lengths whose value at the spectrum peak, $\lambda_B$, corresponds to about three times the value of the spatial period $\Lambda$ of the index modulation, according to: $\lambda_B = 2n\Lambda$, where $n \approx 1.5$ is the refraction index of the optics fiber nucleus.

The behavior of the Bragg's Network is similar to a resonant filter system, i.e., the wave lengths that comply with the resonance condition are affected and the others are ignored.

The Bragg networks useful for the invention purposes comprise the networks prepared before the installation in the differential pressure transducer.

The construction of the Bragg network is performed through the local exposition of the optics fiber nucleus to a two ultraviolet light rays interference standard where the direction in relation to the longitudinal axle of the optics fiber is such that for the network, in relation to the maximum and minimum interference standards are extended along a small part of the fiber in the normal directions to the longitudinal axle and that the periodicity is such desired for the network.

The sensor is comprised of a mono-mode optical fiber usually for the wave length within the 1300 nm to 1550 nm range with the FBG recorded in its nucleus in any position along the fiber. The FBG mechanically coupled to the transducer is examined using an optical system composed of a light source—which may be a broad band laser (C1+C2), or syntonizable as wave length or a light source with issuance's broad band, as a LED or an ASE source—coupled to the fiber nucleus, and a measuring system of the variation of the Bragg's wave length—that may be composed of a spectrum analyzer or of a wave length measuring system, or of an intensity variation (convolution of the signal from the FBG with the fixed filter with the same wave length in the surface).

The signal measurement can be performed either within the transmission or in reflection. For the well bottom applications or in any hard access equipment, the measurements are performed in reflection.

As from the measurement of the Bragg's wave length of the network, the measured value in issue is recovered through a calibration curve that must be raised previously in a lab before setting up the sensor in field.

One invention modality foresees the use of two Bragg's network in the same optics fiber. The networks are written with different wave lengths. The two FBGs are put in the surface of the diaphragm in a counter phase, resulting, as a consequence, that the FBG shall work the tension and the other, the compression. This allows the transducer to auto set-off itself in relation to the effects of the temperature, i.e., due to the two FBGs put practically at the same point, the temperature gradient shall be zero as the diaphragm thickness is small. The measurement system registers the difference between the wave lengths of the FBGs ($\Delta\lambda$). For a temperature variation, the peaks suffer a displacement in its wave length, increasing or decreasing according to the temperature's increase or decrease, respectively, but as it refers to the same material, this $\Delta\lambda$ remains steady for a certain pressure. This configuration is used in the modalities (100, 200 and 300) of the invention's optical transducer.

Alternatively, at least two networks and, preferably, three networks are positioned in the same diaphragm face. In this case, the portions of the spectrum displacements of the two FBGs, $\Delta\lambda_B$, produced by temperature variations would also be identical. The portions of the $\Delta\lambda_B$ related to the diaphragm deflection would be different, however, further allowing in this event the association of the pressure variations with variations in the spectrum difference between the peaks of the signals reflected by the two networks. This alternative is used in the modality (400) of the invention's optical transducer.

During the calibration procedures, the hysteresis has not been noticed.

The invention shall be described next by reference to the Figures attached hereto.

Figure 1B:
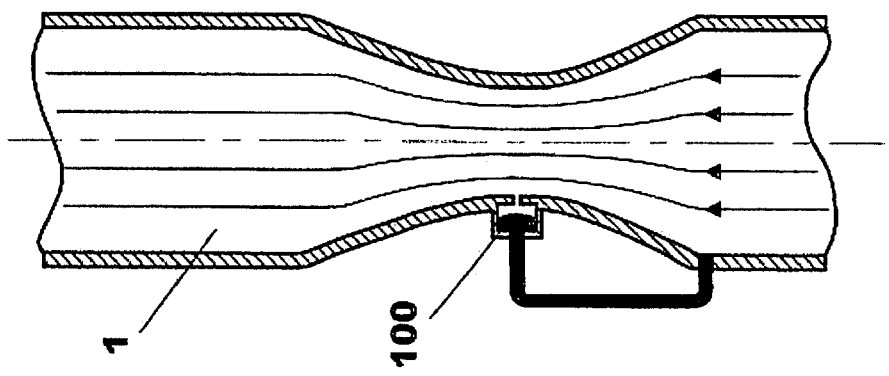
Figure 1A:
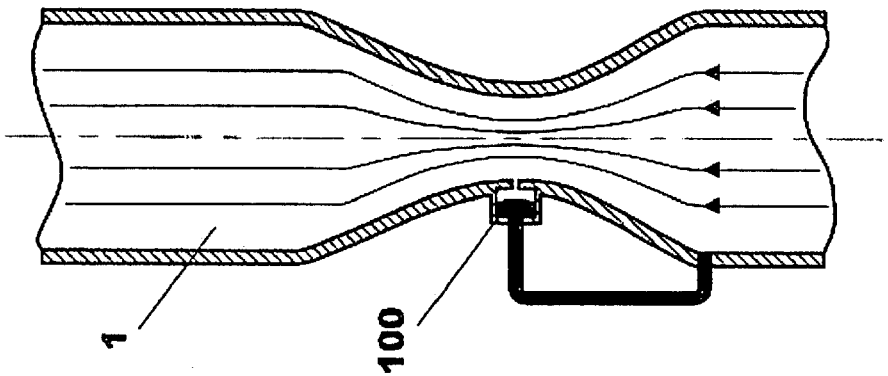

The FIGS. 1A, 1B and 1C shows the arrangement of the differential pressure transducer (100) of optical fiber in a pipeline (1) through which a fluid like oil displaces itself. It is clear that any modality of the invention's transducer (100, 200, 300, 400) may be used to measure the differential pressure in a Venturini set up inside an oil well.

The basis of the invention's transducer operating principle is to produce a cargo loss located in the flow by using a device (Venturi), accomplishing, thus, a pressure increase in the Venturini's restriction. The $\Delta P$ value obtained shall depend on the size of the restriction used, as it can be seen in the sequence of FIGS. 1A, 1B and 1C. In FIG. $1^A$, $\Delta P$ shall have a higher value than in FIG. 1B, and, on its turn, the latter shall be higher than the value in FIG. 1 C. The higher the $\Delta P$, the more charge loss.

Figure 2:
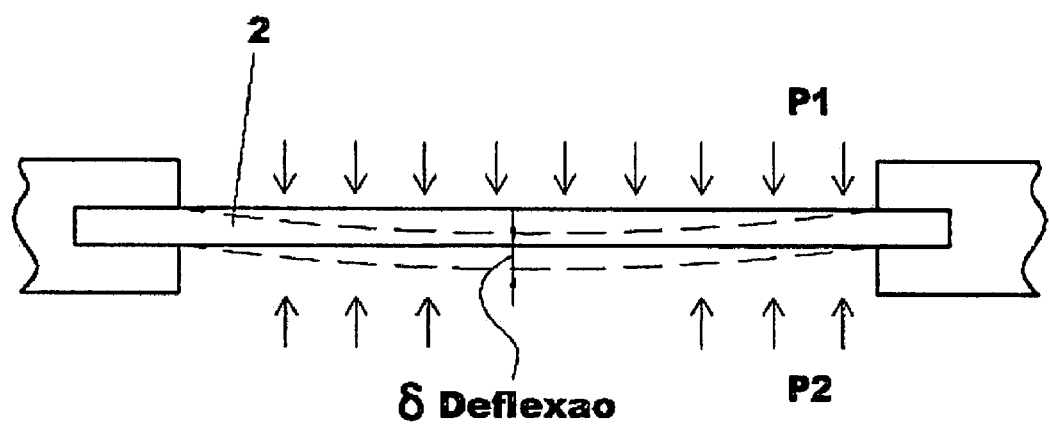
FIG. 2 attached hereto presents the diaphragm of the differential pressure transducer, that shall be deformed due to the $\Delta P$ action in the flow of a fluid that is displaced through a pipeline.

FIG. 2 is the diaphragm scheme (2) used in the modalities of the invention's transducer, being the said diaphragm (2) submitted to a P1 pressure in one of the sides and one pressure P2 in the other, producing $\Delta P$. The deflection caused in the diaphragm (2) by the resulting value of P1 and P2 is indicated as $\delta_{Deflexão}$. In commercial transducers, the $\Delta P$ value is around 0.001 MPa (0.15 psi). Thus, calculations are made to define the thickness and the diameter in order to assure the diaphragm (2) support the pressures without undergoing permanent deformations and, of course, does not reach an extreme condition such as the rupture.

The material of which the transducer (100) and the diaphragm shall be made of shall be any sufficiently resistant material to comply with the operating conditions in oil wells.

FIG. 3 refers to the main body of the differential pressure transducer (100) of optics fiber. FIG. 3A is a perspective view of the main body (110) with a center hole (113) and a lower level (112) in both sides of the said body (110). Passages or holes (111a, 111b) are provided from the body's side (110) up to the center hole (113), touching the surfaces of the diaphragm (2) to insert the optics fiber (not represented) and position the Bragg's network in the center regions of the said surfaces. One channel (114) under spring form is positioned at the center hole (113) to communicate the holes (111a, 111b), allowing the protection and passage of the optics fiber (not represented) from a surface to another one of the diaphragm (2). There are holes (120) in the four corners of the body (110) for the transducer assembly (100) and fixture in a mandrel of a pipeline, as a production and/or injection column.

In the transducer (100), the diaphragm (2) is put parallel to the body. (110).

Figure 3A:
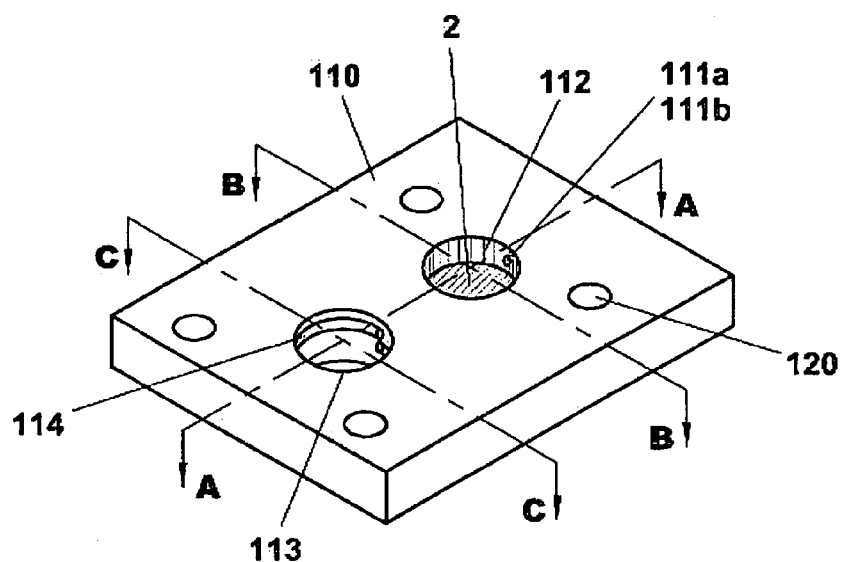
FIG. 3A presents a perspective view of the transducer body with a lower level having the diaphragm and a center hole.
Figure 3B:
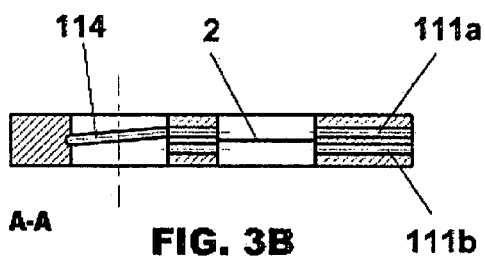
FIG. 3B is an A-A cut of the transducer body showing the direction of the optical fiber inside this body.

FIG. 3B is an A-A longitudinal cut of the body, going through the diaphragm (2) and the center hole (113) showing passages or holes (111a, 111b) for the optics fiber (not represented), the diaphragm (2) and half of the channel under the form of a spring (114).

Figure 3C:
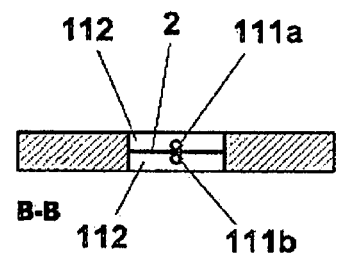
FIG. 3C is a B-B cut of the same body, showing the displacement of the optical fiber in the transducer's body.

FIG. 3C is a B-B cross-section cut of the body (110) going through the diaphragm (2) with the cross-section of the holes (111a, 111b) for the optical fiber (not represented).

Figure 3D:
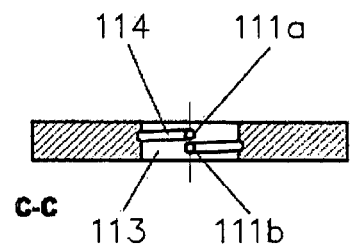
FIG. 3D is a C-C cut showing another part of the displacement of the optical fiber in the tranducer's body.

FIG. 3D is a C-C cross-section cut of the body (110) passing through the center hole (113), showing the channel (114) under spring form with the cross-section of the holes (111a, 111b).

Figure 4A:
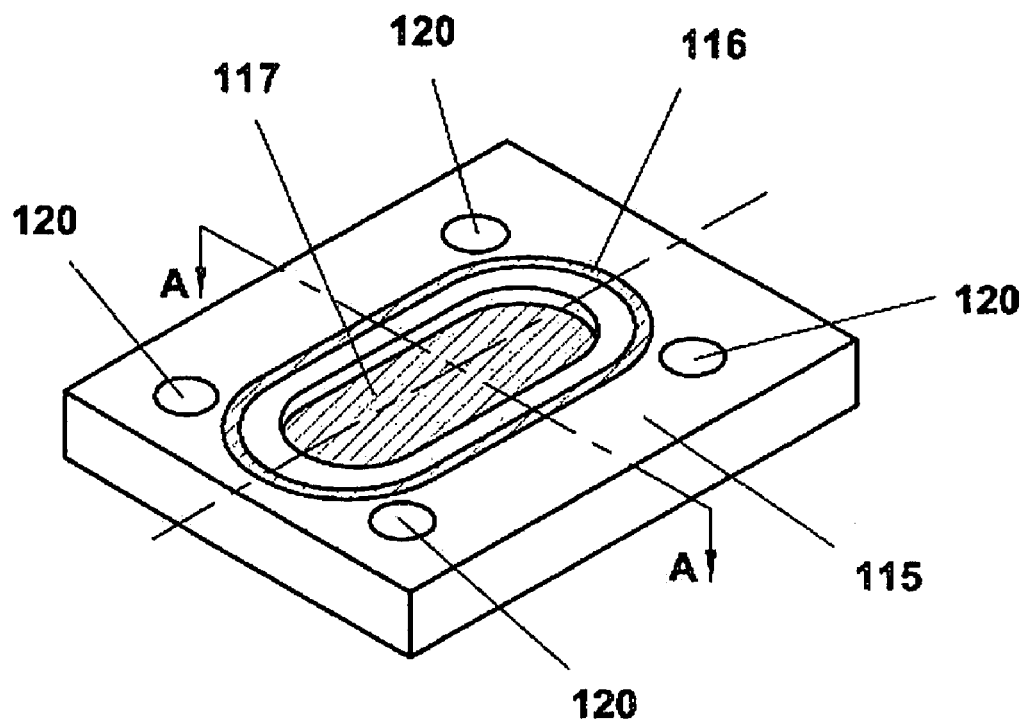
FIG. 4A attached hereto presents a perspective view of the cover of the optical transducer (100) of the invention, with a channel for mechanical seal and notches for fixing the dispositives to the transducer's body.

FIG. 4A is a perspective view of the cover (115) that is connected to the body (110) to form the transducer (100). The cover (115) has a channel (116) to enclose an O-Ring type seal and a lower level (117), and the ends of the said lower levels are coincident and have the same dimension of the center hole (113) and the lower level (112). The holes (120) are just as in FIG. 3A.

Figure 4B:
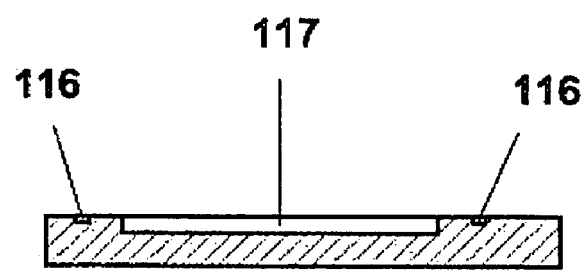
FIG. 4B is a B-B cut of the same cover.

FIG. 4B is a B-B longitudinal cut of the cover (115) showing the channel (116) for the O-Ring and the lower level (117).

The cover geometry (115) is such that it not only seals the upper part of the transducer (100), but it also communicates the center hole (113) of the body (110) to one of the diaphragm's surface (2) where the pressure acts, as the other diaphragm's surface (2) is already in contact with the other pressure plug.

The connection body (110)/cover (115) of the transducer (100) is completed by holes (120) for the inclusion of fixing devices (not represented) which go beyond the four corners of the body (110) and of the cover (115).

Figure 5:
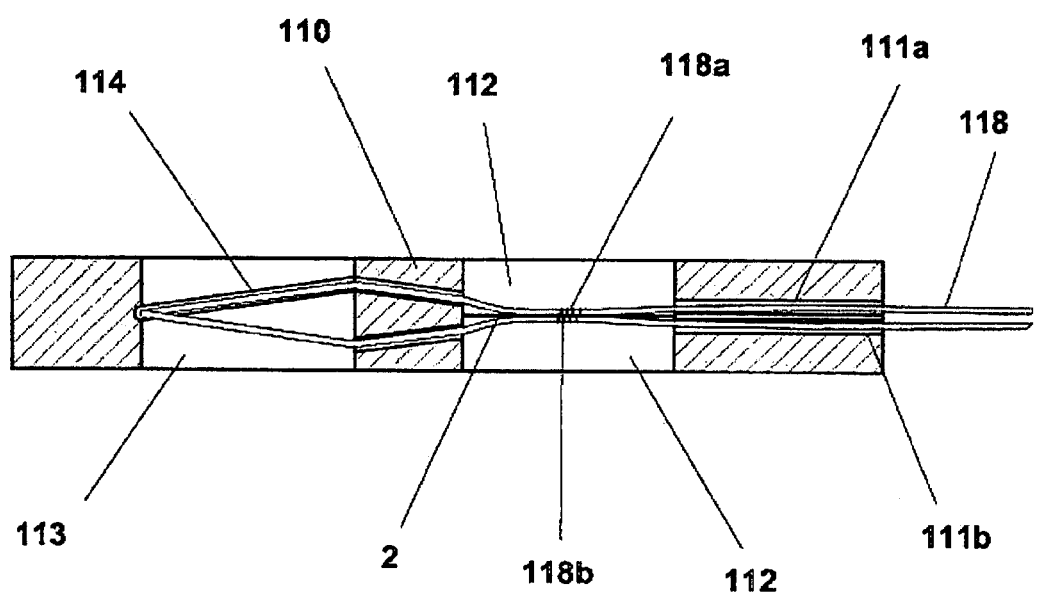
FIG. 5 shows the assembly scheme of the optical fiber in the transducer (100).

FIG. 5 shows how the assembly of the Bragg's network (FBG) was performed in the transducer (100): the optics fiber (118) with the FBGs (118a, 118b) enters through one of the holes (111a or 111b) made on the body (110) in a way that one FBG is positioned in the central region of one diaphragm's surface (2). The optics fiber (118) continues until it gets to the center hole (113) of one of the diaphragm's surface (2). The optics fiber continues (118) until reaching the center hole (113), going round this hole through the channel under spring form (114) until it reaches the other hole (111b or 111a) in order to arrive quickly to the other diaphragm's surface (2), positioning the second FBG in the central region of this surface. Next, the optics fiber (118) continues inside the said hole (111a or 111b) until they leave the body (110) to connect themselves to another device with the same technology or to a measurement system.

The transducer (100) is tested in relation to the sealing, pressure measurement and setting-off in relation to the effects of temperature, being approved in all tests.

During the transducer's calibration (100) it is established a directly proportional relation between $\Delta P$ and $\Delta \lambda$. For the measurement conditions applied, the hysteresis is not noticed.

The transducer (100) may be used as an unique equipment, i.e., either in the monopoint or in the multipoint mode, being, thus, set up in a series, provided this is consistent with the sensoring techniques employed. The configuration of the said transducer, shown in FIGS. 3A, 3B and 3C and 4A, 4B allows a great variety of these transducers (100) with an optics fiber with Bragg's network (118a, 118b) affixed to a diaphragm (2) are connected in series by the optics fiber (118) in common to measure the multiple points of differential pressure in the distributed sensor. Any multiplexation techniques may be used to distinguish the signal of a sensor from the sound of another one, such as multiplexation by dividing the wave's length (WDM) or multiplexation by dividing the time (TDM) or other multiplexation techniques. In this event, the network (118a/118b) in each sensor has a wave length of different reflection.

A second modality of the invention is a transducer (200) made of optics fiber with Bragg's networks for measuring the differential pressure where the diaphragm (2) is isolated from the process fluid through a mechanical seal(201).

Upon the differential pressure transducer set up of the well bottom flow measurer, the process fluid is water or oil, and it may also has gás, water and sand particulates. The diaphragm (2) must be isolated so that its thickness, expressed in decimals of millimeters, does not undergo erosion or suffer a chemistry attack, reducing the transducer's useful life. Besides, in the event the Bragg's network are pasted in the diaphragm's faces (2), the adhesive cannot be degraded by the refill fluid of the mechanical seal. The inertial fluid selected to fill the mechanical seal is the silicone oil, without being limited to it.

Figure 6A:
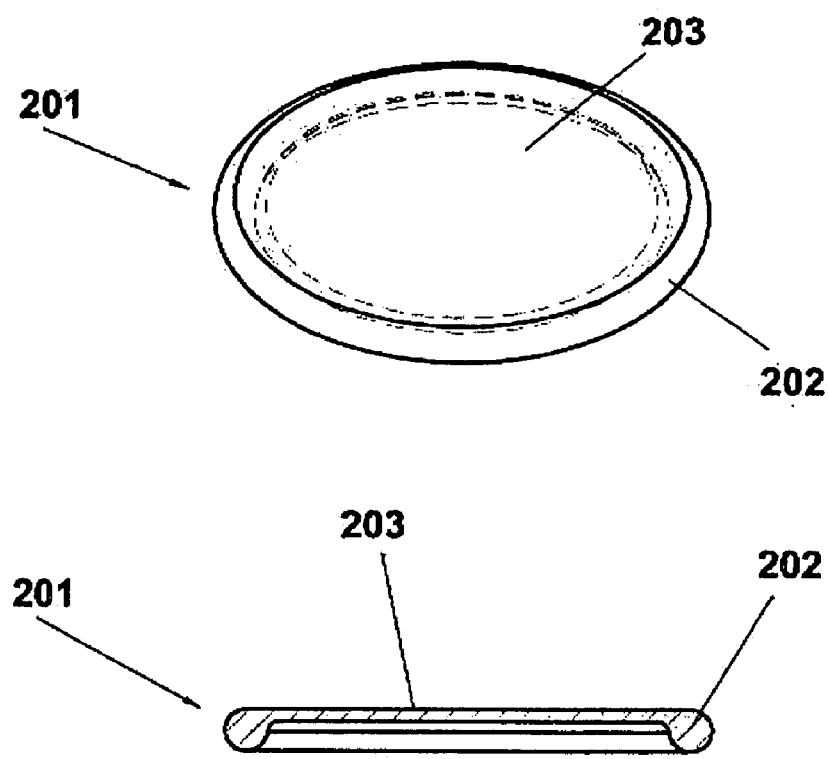
FIG. 6A attached hereto shows a cut of the flexible mechanical seal and FIG. 6B attached hereto shows the differential pressure transducer scheme (200).

FIG. 6A presents the mechanical seal drawing (201) that has been designed. The seal basically comprises the (O-Ring) (202) and a membrane (203) within a sole part.

Figure 6B:
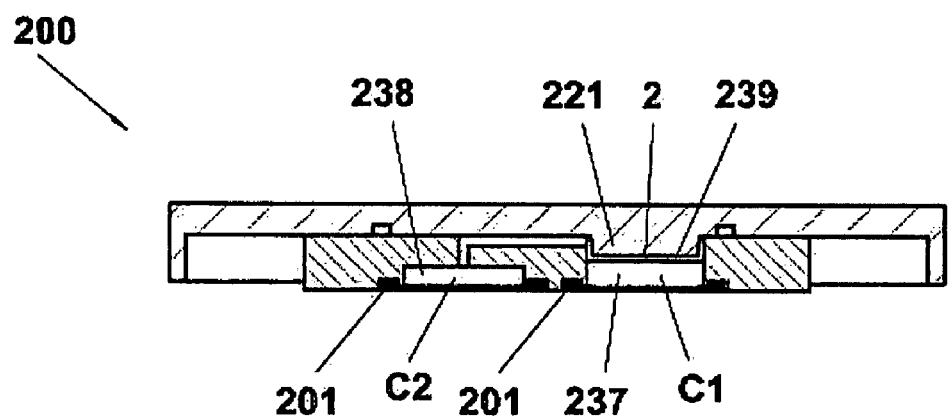

FIG. 6B shows through a scheme the section of the pressure transducer (200) where the flexible mechanical seals (201) are in the working position. FIG. 6B shows the transducer body (200) with the chambers C1 and C2 and the pressures P1 and P2 acting over the said seals (201). The chamber C1 is formed by the volume of the lower level (237) made in the inferior surface (231) (FIG. 8A) of the transducer's (200) body (230) and the diaphragm's surface. The C2 chamber comprises the volumes corresponding to the lower level (238) in the inferior surface (231) (FIG. 8A) of the transducer's body (230), the hole (233), the channel (243) in the upper surface (241) (FIG. 11) and the lowering (239), made in the superior surface (241) of the transducer's body (230) and the diaphragm's opposite surface (2). Both volumes of the C1 and C2 chambers are equal, and that's the reason for the existence of the pin (221) inside the lower level (239) in the upper surface (241) of the transducer's (230) body (200).

Figure 7:
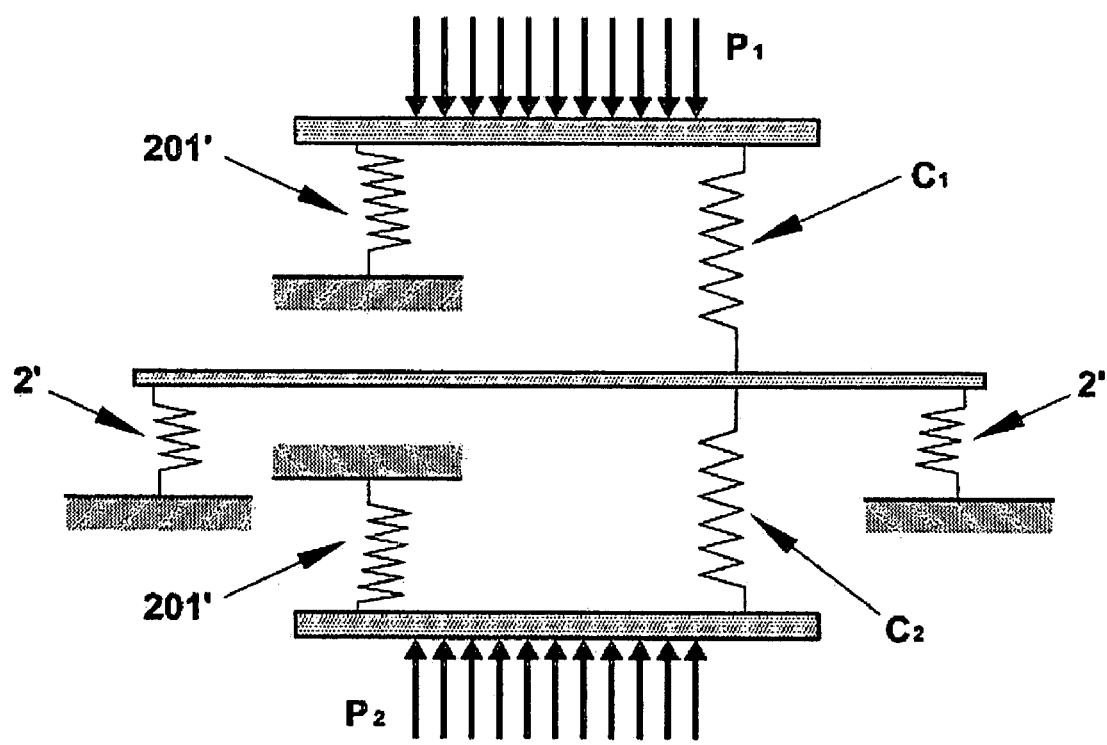
FIG. 7 attached hereto shows a mechanical model of the mechanical seal, being the rigidity of the elastic elements represented by springs.

FIG. 7 represents the simplified mechanical model of the mechanical seal, where the rigidity of the elastic elements is represented by springs. The rigidity of the chamber with the silicone oil is inversally proportional to the compressibility of the liquid and to its volume. The two flexible mechanical seals (201) are identical, so that the springs (201') that represent the said seals have the same rigidity. We notice, however, that if the rigidity of the two springs that represent the C1 and C2 chambers are different, when the P1 and P2 pressures are equal and the differential pressure null, the flexion effort over the transducer's diaphragm (200) shall be different from zero. So, FIG. 7 justifies the fact that the two chambers C1 and C2 must have the same volume.

FIGS. 8A through 8E and FIGS. 9A through 9E shows views and modalities cuts (200) of the invention's transducer.

The diaphragm (2) is placed in the transducer (200) parallel to the body (230).

The modality of the invention's transducer (200) comprises:
a) upper cover (220), with pin (221) aimed at equalizing the volume of the C1 and C2 chambers and channel (222) for the sealing O-Ring;
b) body (230), that comprises:
inferior face (231) with a first full C1 chamber and part of a section C2 chamber, housing (232) for the mechanical seals (201) and a communication hole (233) between the superior (not represented) and the inferior (231) corresponding to the second C2 chamber;
superior face (241) that comprises the communication hole (233) between the channel and the superior face of the diaphragm (2) opposed to the first C1 chamber, the said hole (233), the channel (243) and the superior face, making part of the secon chamber C2;

and where the central region of the said body (230) has two passing, longitudinal holes (234, 235), vertically located in comparison to each other, being those holes (234, 235) directed to the insertion of the optics fiber (118) with Bragg's networks (118a, 118b) to position the said networks in each surface of the diaphragm (2);
a channel in the longitudinal face of the body (230) directed to refrain/protect the optics fiber (118) upon its passage from a sided face to another sided face of the said body (230);
c) inferior cover (250) presenting two holes (251a, 251b) for reading the pressure;
d) flexible mechanical seals (201) to transmit the pressure up to the diaphragm's surfaces (2), being the seals (201) put in their respective housings (232) in the inferior face (231) of the body (230), being those seals pressured by the lower cover (250) to provide sealing to the C1 and C2 chambers.

The body (230) also has holes (271) for the fixing devices in mandrel and (272) for assembling the transducer (200).

The passing hole (234) presents a 7° slope in relation to the longitudinal axle as from the end of the diaphragm (2).

FIG. 8A is a view of the inferior face (231) of the transducer's (200) body (230).

FIG. 8B is a B-B cross-section cut of the said body (230) passing through Chamber C2. In this FIGURE the cross-section of the hole can be seen and it presents a 7° slope. The hole (235) is also well represented, as well as the seal (201) housing (232) and the communication hole (233) between the superior face (241) of the body (230) and the C2 chamber that is in the inferior surface (231) (FIG. 8A) of the said body. The longitudinal (236) channel for the passage of the optics fiber by the body's side is also seen.

FIG. 8C is a detail of (D) FIG. 8B showing the lowering and softening in the lower part of the housing (232) of the mechanical seal (201) to avoid the mechanical seal (201) shearing.

FIG. 8D is the C-C cross-section cut, passing through the diaphragm (2), showing the channel (243) that, together with the hole (233) communicates the part of the chamber C2 in the inferior face (231) of the body (230) with the other part of the C2 chamber located in the superior face of the diaphragm (2). It is also represented herein: the parallel holes (234, 235), i.e. the hole (234) does not show a 7° deviation, the full section of C1 chamber and part of the C2 chamber, the longitudinal channel (236) and the mechanical seal (201) housing (232).

FIG. 8E is an A-A longitudinal cut passing through the two chambers C1 and C2, with the hole (234), the hole (235), the C1 and C2 chambers, the mechanical seals (201) housings (232), the channel (243) and the diaphragm(2).

Figure 9A:
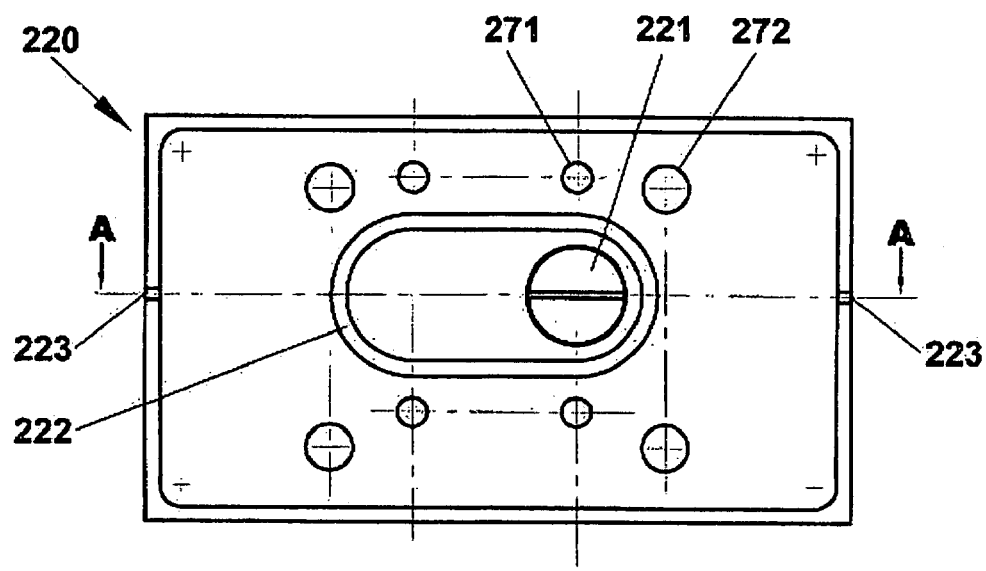
FIG. 9A attached hereto shows the lower view of the transducer cover (200).

FIG. 9A shows the inferior view of the upper cover (220) of the transducer (200), with the pin (221) and the slot (223) to easy the passage of the fiber (118).

Figure 9B:
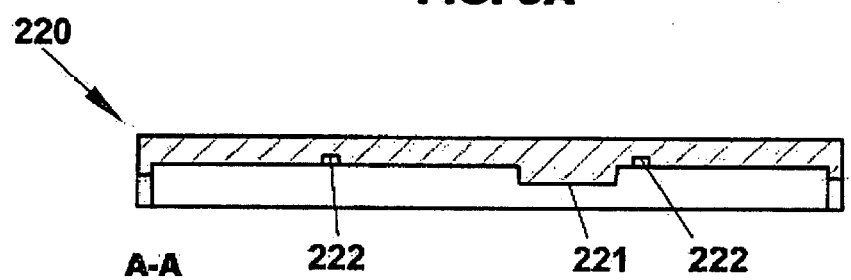
FIG. 9B attached hereto shows the longitudinal A-A cut of the upper cover.

FIG. 9B is a longitudinal cut of the superior cover (220) of the transducer (200) with pin (221) and channel (222) for the O-Ring.

Figure 9C:
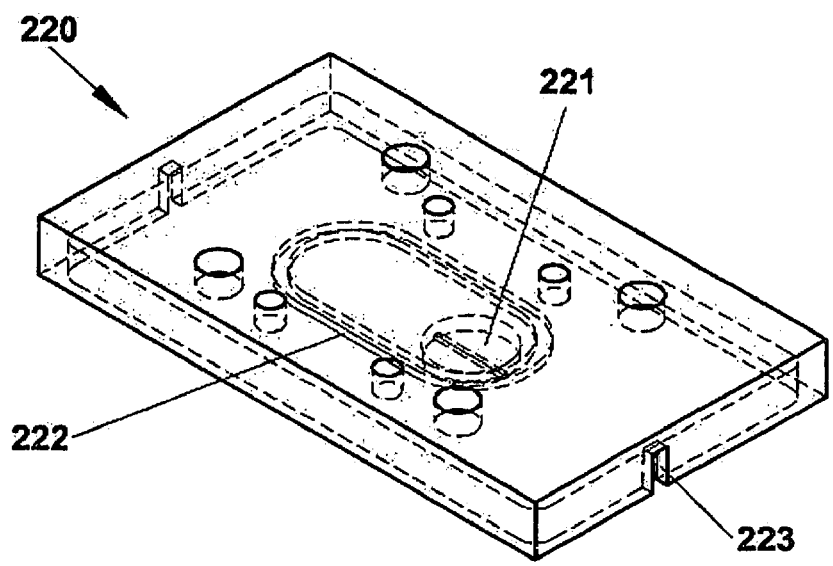
FIG. 9C attached hereto shows a view in perspective of the upper cover of the transducer (200).

FIG. 9C shows a perspective view of the superior cover (220), showing the slot (223) for the optics fiber's entrance and/or exit (118), the holes (272) for fixation devices in a mandrel of a well and the holes for fixing devices in a mandrel of a Well and the holes (271) for fixing devices for assembling the transducer (200).

Figure 9D:
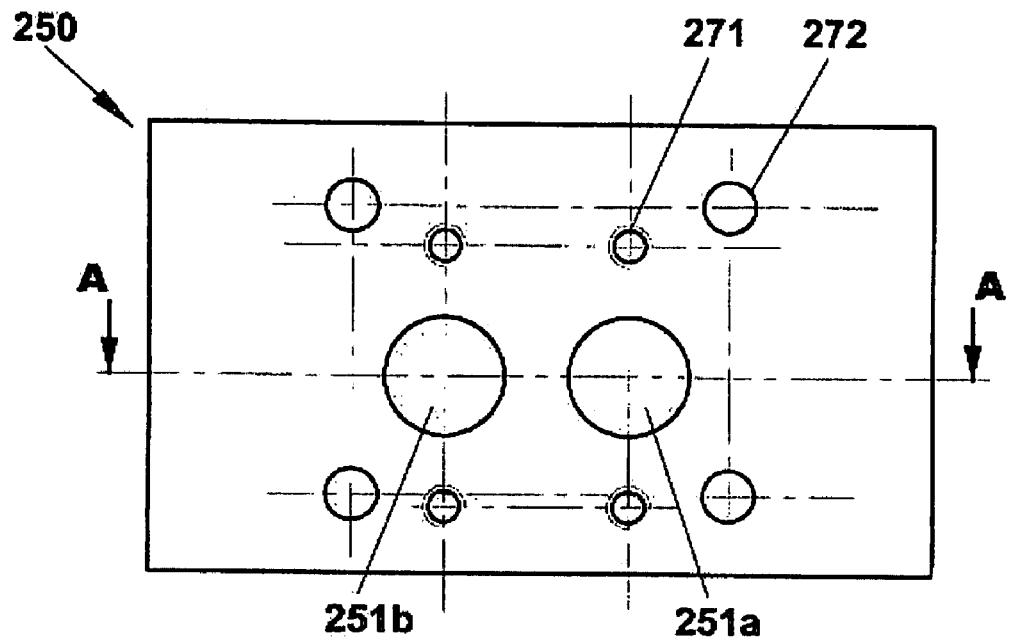
FIG. 9D attached hereto shows the upper view of the lower cover with the holes for the pressure plugs.

FIG. 9D is the aerial view of the inferior cover (250) with the holes (251a, 251b) for the pressure plugs.

Figure 9E:
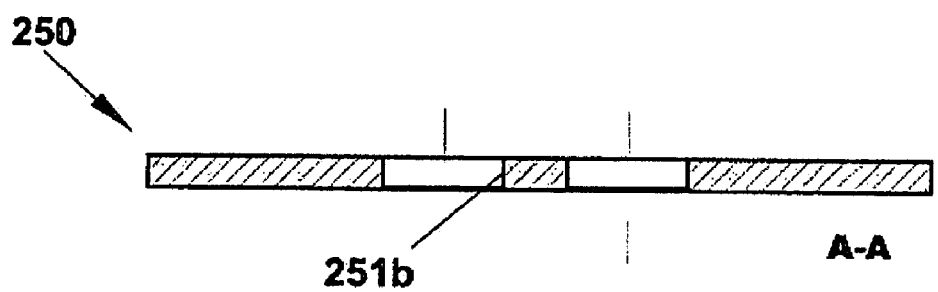
FIG. 9E shows a view in perspective of the lower cover, showing the holes for the pressure plugs, the holes for its set up in a mandrel and the holes for the transducer assembly (200).

FIG. 9E shows a perspective view of the inferior cover, showing the holes for the pressure plugs, the holes (272) for setting up a mandrel, the holes (271) for assembling the transducer (200).

Figure 10C:
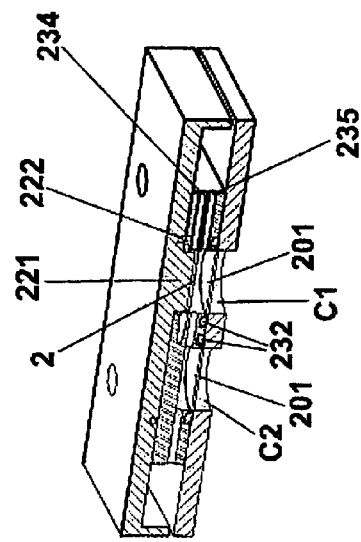
FIG. 10C is a cross-section cut of the view of the assembled transducer (200) in perspective.
Figure 10B:
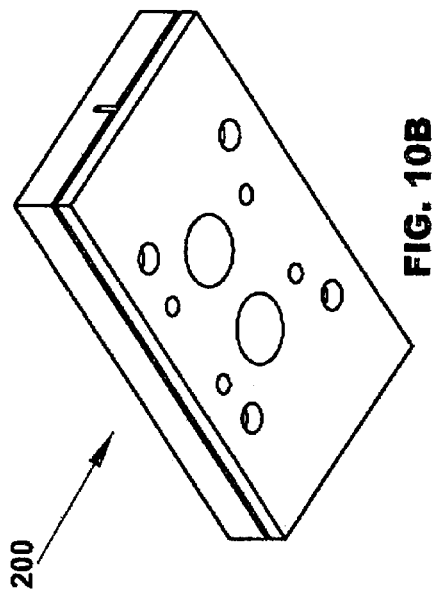
FIG. 10B shows a perspective view of the assembled transducer (200).
Figure 10A:
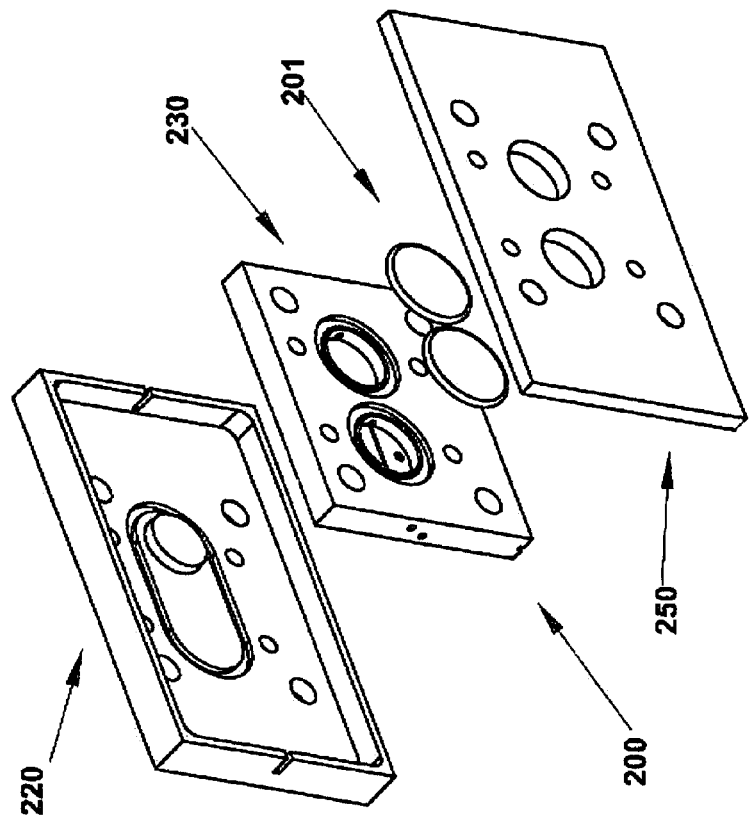
FIG. 10A attached hereto shows the exploded view of the transducer parts (200) with the upper cover, body, mechanical seals and lower cover.

FIG. 10A shows an exploded view of the transducer (200) with the upper cover (220), the body (230), seals (201) and the inferior cover (250).

FIG. 10B shows a set view of the transducer (200) in the closed mode.

FIG. 10C shows a longitudinal cut showing the C1 and C2 chambers, the passing holes (234, 235) for passing the optical fiber (118) and housings (232) for the mechanical seals (201). The pin (221), the channel (222) and the O-Ring are also represented here.

Figure 11A:
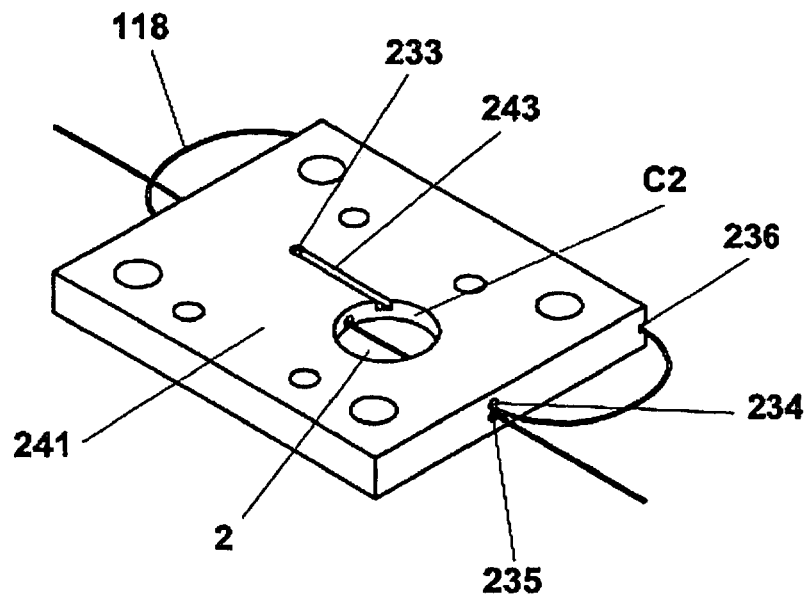
FIG. 11A attached hereto shows the transducer body (200) showing the direction of the optics fiber.

FIG. 11A shows the superior face (241) of the body with a C2 chamber, diaphragm (2), channel (243) and the course of the displacement of the optics fiber (118) through the holes (234, 235) and the longitudinal channel (236) in the side part of the body (230) for the optics fiber's protection (118).

Figure 11B:
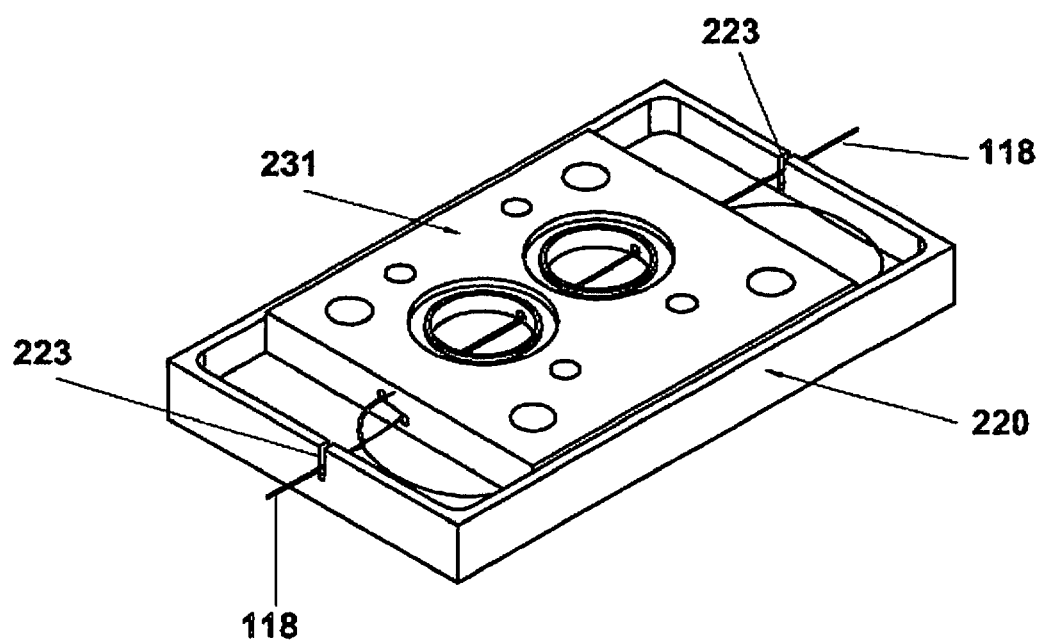
FIG. 11B shows the lower perspective of the body connected to the upper cover, showing the exit of the networks through the upper cover.

FIG. 11B shows the body (230) inserted in the superior cover (220) (220) with a slot (223) to make the optics fiber displacement easier. (118).

Another modality of the invention is the differential pressure transducer(300) made of optics fiber with Bragg's networks. The transducer (300) has two micro valves of the kind shown in FIG. 12, to perform the reduction of the pressure when it exceeds a certain value that could deform the diaphragm (2). The protection against the differential over-pressure is useful when there is na obstruction of one of the pressure plugs of the mandrel where the Venturi is inserted or during the intervention.

Figure 12:
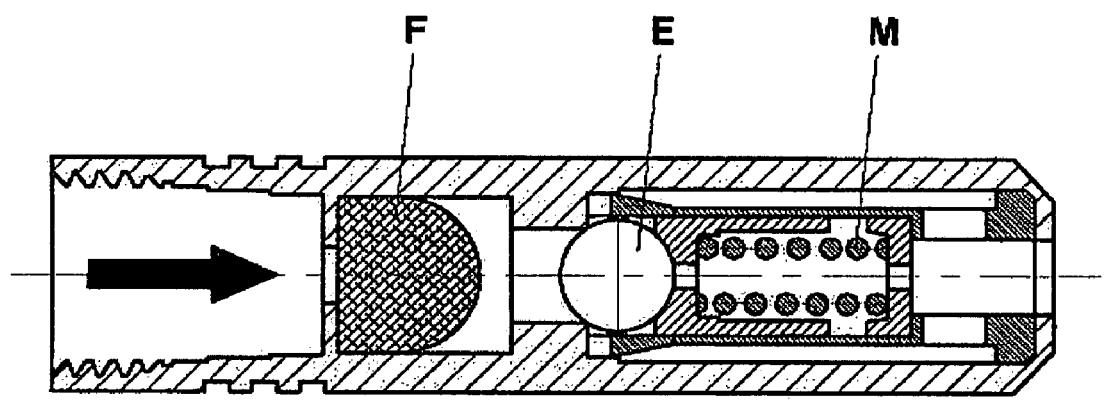
FIG. 12 attached hereto shows the cut of a commercial relief micro valve.

FIG. 12 shows the relief micro valve, commercial, model PRFA 1875 100L and PRRA 1875 100L, (Lee Company) which operates in such a way that when the pressure in one of the chambers C1/C2 of the transducer (300) exceeds a specified value (above which there shall occur permanent or plastic deformation of the diaphragm (2)), the system, composed of a ball sphere (E) and a calibrated spring (M) displaces itself so as to allow the passage of the fluid through a filter (F) to reduce pressure.

In the transducer (300) the diaphragm (2) is located in the transversal position in relation to the body (360).

The differential pressure transducer(300) comprises:
a) an upper cover (370), in the form of a rectangle, with an empty space (371) to connect with the superior part of a body (360) and a tear (372) in the central part of the side portions directed to the passage of the optics fiber (118), either entering or exiting from the body (360);
b) body (360), where:
  i) its superior part has two longitudinal lower levels (361) to adapt the superior cover (370) in the said body (360) and a transversal lower level (362) with a semi-circular form;
  ii) its inferior part has lower levels (366) to house the mechanical seals (201) and the sealing channels (365) for the said mechanical seals;
  iii) its internal part has pressure chambers C1 and C2 separated by the diaphragm (2), housings (364) for micro valves and communication channels (368a, 368b) between the housings and the pressure chambers C1 and C2 and where the holes (369a,369b) make the communication between each pressure chamber C1, C2 with the respective mechanical seal (201); and
c) inferior cover (375), with holes (376a, 376b) for the pressure plug.

Figure 13A:
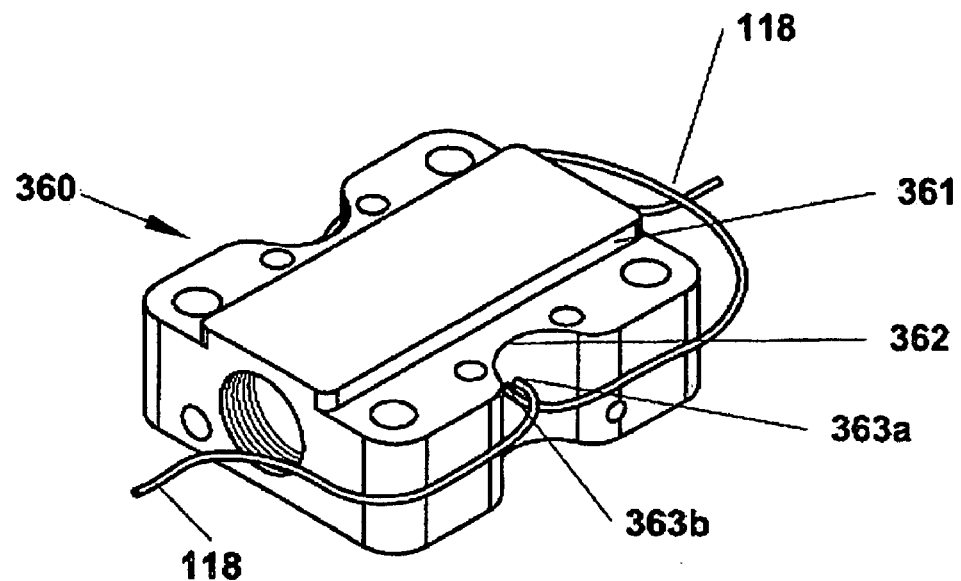
FIG. 13A attached hereto shows the aerial view of the invention's transducer (300).
Figure 13B:
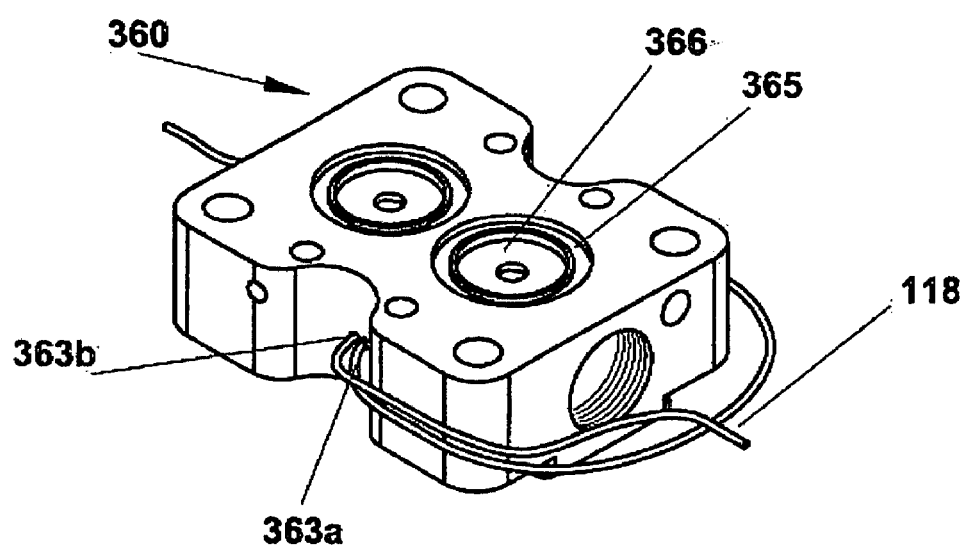
FIG. 13B shows the bottom view, with the course of the optics fiber.

FIGS. 13A and 13B show the course of the optics fiber (118) in the body (360) of the transducer (300). The fiber (118) enters through one of the holes (363a/363b) towards one of the diaphragm's surface (2), the Bragg's network is positioned in the center of one of the surfaces of the said diaphragm, and continues the course until it exits in the opposite side than it has entered. The fiber (118) rounds the body (360), by any side and enters again in the body (360) through the free hole (363a/363b), positioning the Bragg's network included in the fiber (118) in the other surface of the diaphragm(2). The fiber (118) exits the body (360) in order to connect with an optics cable (not represented) or other transducer with the same type of technology.

Figure 14:
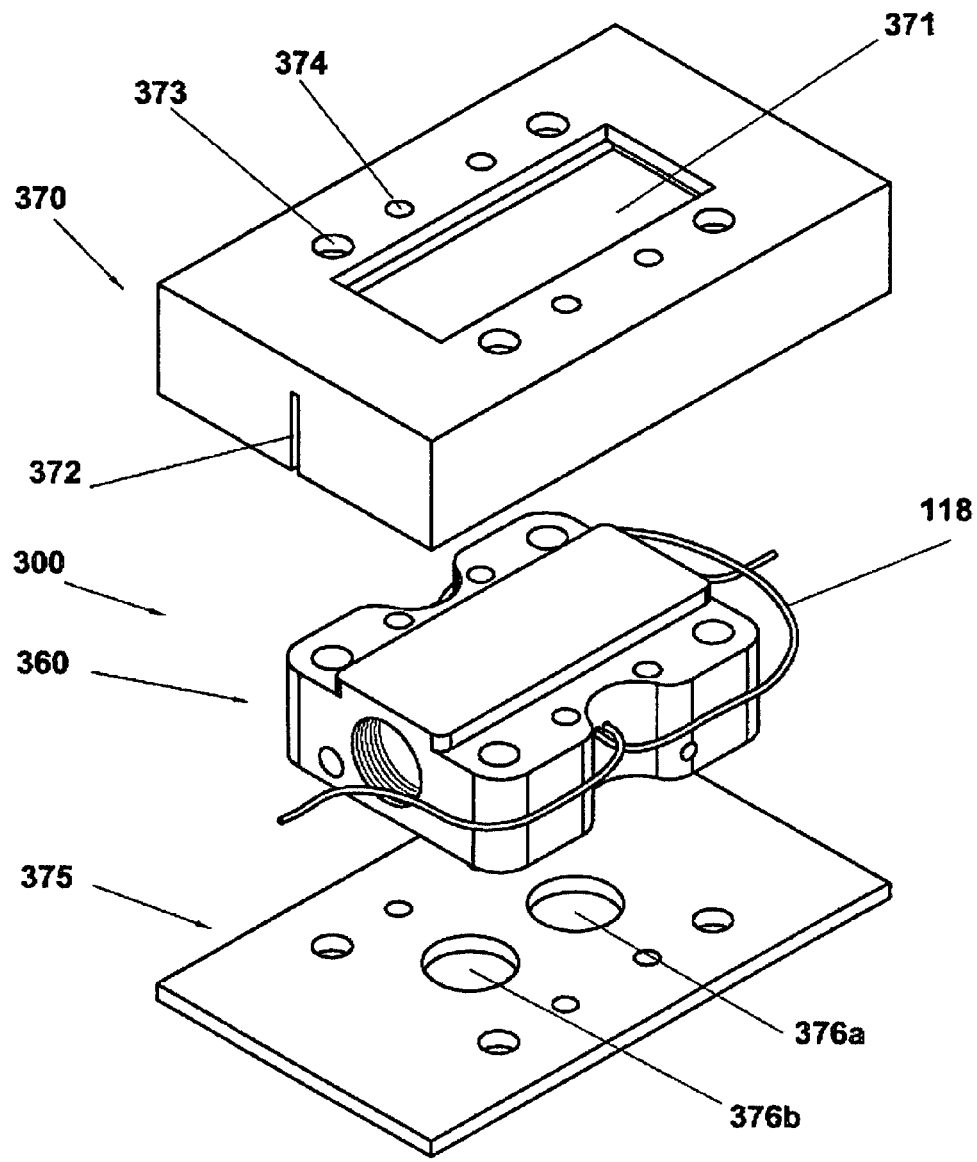
FIG. 14 shows in an exploded view the transducer assembly (300), with the superior cover, body and bottom cover.

FIG. 14 is the view of the set comprised by the transducer (300) with the superior cover (370), the body (360) and the optics fiber (118) and the inferior cover (375). The superior cover (370), in the form of a rectangle, with an empty space (371) to connect with the superior part of a body (360) and a tear (372) in the central part of the side portions directed to the passage of the optics fiber (118), either entering or exiting from the body (360); Holes (373) for fixing devices (not represented) are aimed at fixing the transducer (300) to the mandrel. Holes for fixing devices (not represented) are directed to assemble the body (360) and superior (370) and inferior (375) covers of the transducer. The inferior cover (375) has holes (376a, 376b) for the pressure plugs.

Figure 15:
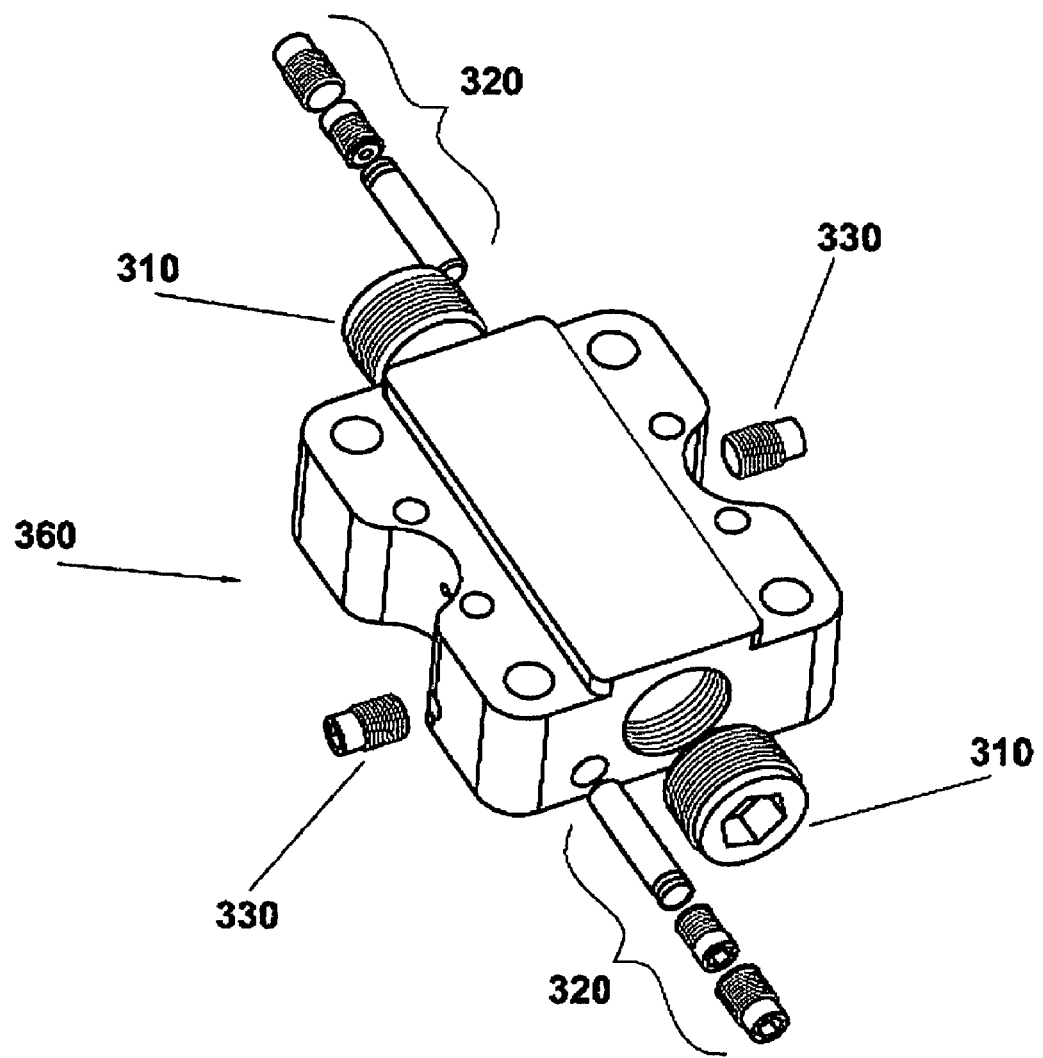
FIG. 15A attached hereto shows the transducer's body (300) with the micro valves.

FIG. 15 shows na exploded view of the body (360) with microvalves, sealing plug of the microvalves, sealing plug of the pressure chambers C1 and C2 and sealing plug (330) of the communication channel between the microvalves and the pressure chambers C1 and C2.

Figure 16B:
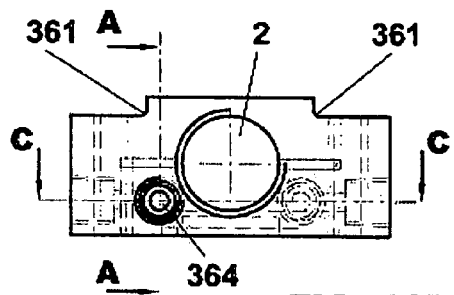
FIG. 16B is the frontal view of the same body.
Figure 16C:
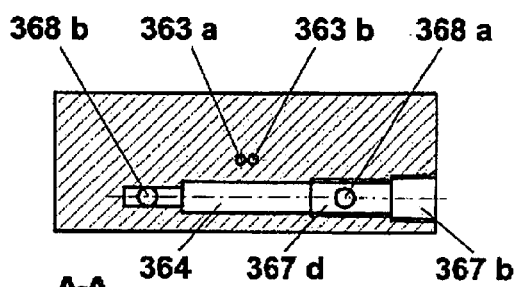
FIG. 16C is the A-A cut passing through the housing of one of the micro valves.
Figure 16A:
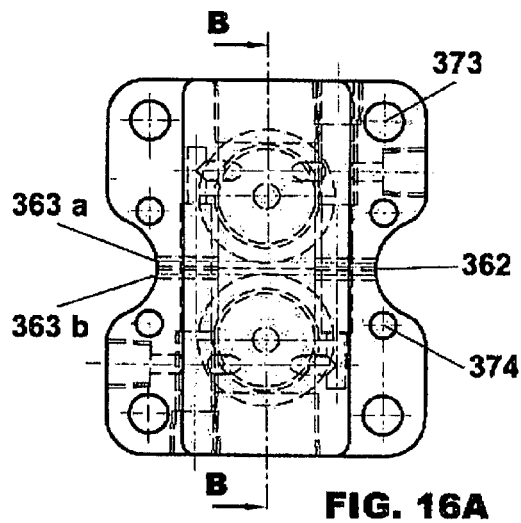
FIG. 16A attached hereto shows the upper view of the transducer body (300).

FIG. 16A shows the body of the (360) transducer (300) with housing (364) for the relief microvalve in order to equalize the pressure within the pressure chambers C1 and C2.

The body (360) has two relief microvalves in each chamber (C1 e C2), and the purpose of these microvalves is to equalize the pressure in the transducer when, due to any reason, the pressure in one of the chambers surpasses the amount that has been calculated, protecting, thus, the integrity of the diaphragm (2) and avoiding the rupture of the optics fiber, assuring the continuity of the complete system.

Notice that the body is a sole part (360), with no connection or joint, where the diaphragm (2) is usinated in the body itself.

The upper part of the body (360) presents two longitudinal lower levels (361) (FIG. 13A) directed to adapt the superior cover (370) in the body (360) so that the transducer (300) may be mounted without any problem in the mandrel (not represented) of a production and/or injection column manufactured with the smaller diameter. (2"⅞).

The body (360) also has a transversal lower level in the form of a semi-circulus, what allows a bending Ray in the optics fiber (118) that minimize the losses due to its inclusion in the entrance and exit of the optics fiber (118) through the holes (363a, 363b) that conduct the optics fiber (118) with Bragg's networks up to the surfaces of the diaphragm (2) where the said networks are fixed. The Bragg's network are fixed in the central part of each surface of the diaphragm (2).

Figure 16E:
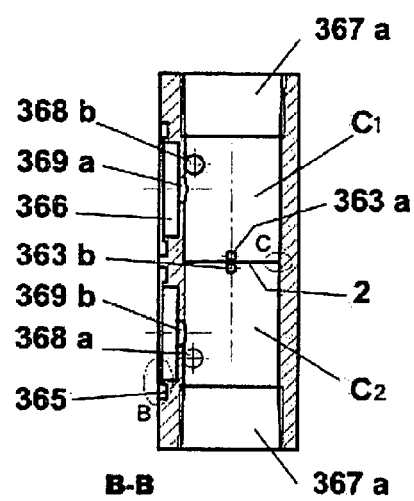
FIG. 16D is a C-C cut, passing through the housing of the two micro valves. FIG.
FIG. 16F is a detail of the internal wall of the mechanical seal channel and the softening in this wall, relative to FIG. 16E.
FIG. 16G is a detail of the softening radium of the diaphragm in the setting relative to FIG. 16E.

The inferior part of the body (360) has lower levels (366) to house the mechanical seals (201) and sealing channels (365) for the said mechanical seals (FIG. 16E).

FIG. 16B shows the front view of the body (360) with the lower level (361), the diaphragm (2) and the housing of the (364) microvalve (not represented).

FIG. 16C is an A-A cut of FIG. 16A. It is represented therein the plug (320) housing (367b) for sealing the microvalves housing (364), housing (367d) of the device to fix the microvalves and the microvalves' housing (364). It is also represented the holes section (363a, 363b) for the passage of the fiber (118).

Figure 16D:
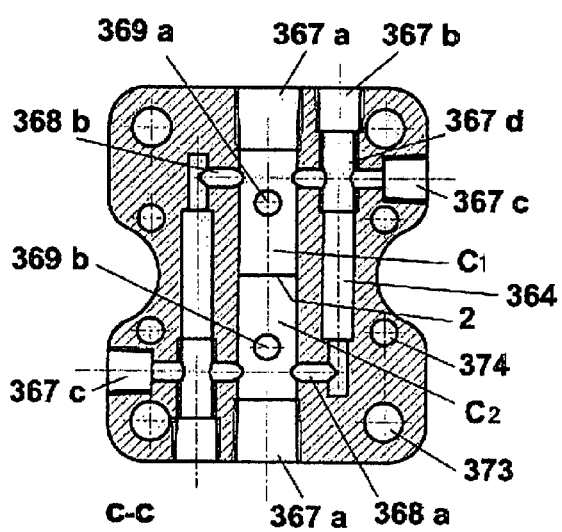

FIG. 16D is a C-C cut FIG. 16B, with the plug housing (367a) (310) to seal the pressure chambers C1 and C2 and the pressure chambers C1 and C2 separated by the diaphragm (2). The chambers C1 and C2 are symmetric in relation to the diaphragm (2). It can also be seen the sealing plug housing for the microvalves' housing (367b), (320), (364) (not represented), housing of (367d) the fixing device of the microvalves and the microvalves' housing. It is also represented the plug housing (367c) (330) for sealing the communication channels (368a,368b) between the housings (364) of the microvalves and the pressure chambers C1 and C2. Holes (369a,369b) perform the communication between each chamber C1, C2 with the respective mechanical seal (201). The devices (373) aims at fixing them to the mandrel and (374) to fix it in the assembly.

FIG. 16E is a cross section B-B of FIG. 16A. It can be observed therein the symmetry of the pressure chambers C1 and C2 in relation to the diaphragm (2), housing (367a) of the sealing plug (310) of the pressure chambers C1 and C2, holes (363a, 363b) for passing the optics fiber (118) taking the Bragg's network up to the surfaces of the diaphragm (2); cross-section cuts of the communication channels (368a, 368b) between the microvalves and the pressure chambers C1 and C2; cross-section of the lower levels (366) to house the mechanical seals (201) and sealing channels (365) for the said mechanical seals (201); communication holes (369a,369b) of each chamber C1 and C2 with the mechanical seal (201).

Figure 16F:

FIG. 16F is the detail of FIG. 16E indicating that the internal wall of the sealing channel (365) of the mechanical seal was lowered (201) to the extension of the thickness of the mechanical seal (201) and it was softened, protecting the said seal against the shearing.

Figure 16G:
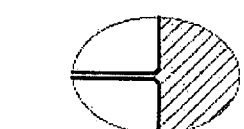

The detail of FIG. 16G it is represented the detail B of FIG. 16E. There, it is indicated the softening of the diaphragm (2) in the joint.

The optics fiber (118) has two Bragg's network (118a, 118b), each one of them settled over the central region of each surface of the diaphragm (2). The networks (118a, 118b) have different wave lengths, so that depending on whether they are under tension or compression, the flow direction may be identified.

Figure 17A:
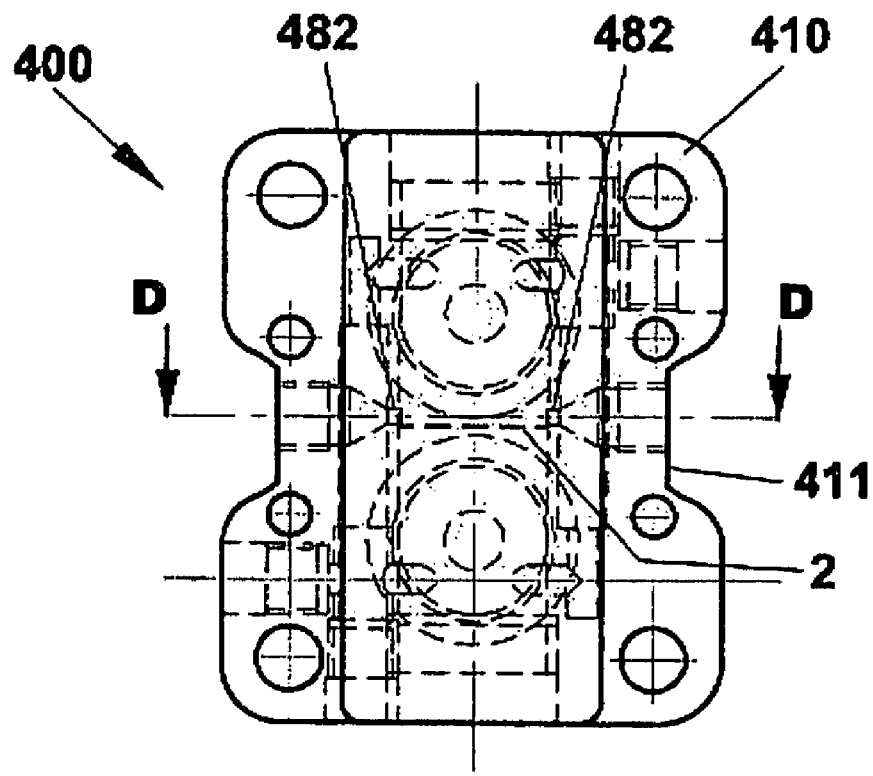
FIG. 17A attached hereto is the upper view of the transducer body (400) of the invention.

FIGS. 17A, B and C shows another modality of the invention's transducer, generally designated by the number (400). This modality does not require a superior cover and the inferior cover has exactly the same size that the body (410) has. The transducer (400) is similar to the transducer (300) with the following differences listed below.

FIG. 17A shows the body (410) with a transversal lower level (411) with a sole channel (not represented) to pass the optics fiber (118) with the Bragg's network up to the diaphragm (2). Holes (373) and (374) are as presented in FIG. 16A.

Figure 17B:
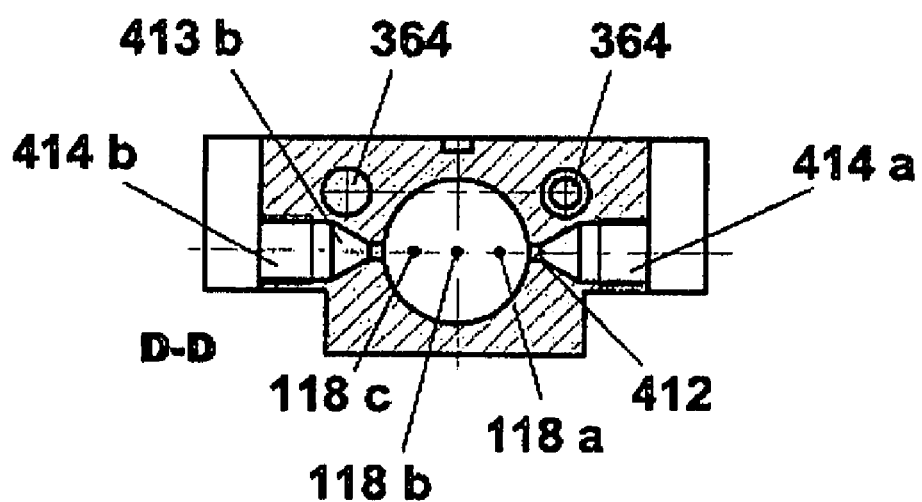
FIG. 17B is the cross-sectional cut of the body, passing through the diaphragm.

FIG. 17B is a D-D cut. FIG. 17A with the passage hole (412) of the optics fiber (118), Bragg's network (118a, 118b e 118c), housing (413a, 413b) for the sealing ring (not represented) and housings (414a, 414b) for the ring fixing devices (not represented) directed to seal the pressure chambers C1 and C2 of the transducer (400). The micro valves' housing can still be noticed.

Figure 17C:
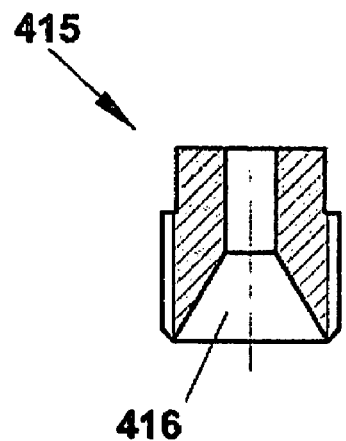
FIG. 17C is a cut of the fixing bolt of the seal nut.

FIG. 17C shows a cross-section cut of the fixation device of a sealing ring (415). The device (415) performs the sealing of the pressure chambers C1, C2 to avoid leakage (silicone oil) of the liquid inside these chambers. The ring housing is indicated by a number. (416).

Figure 17D:
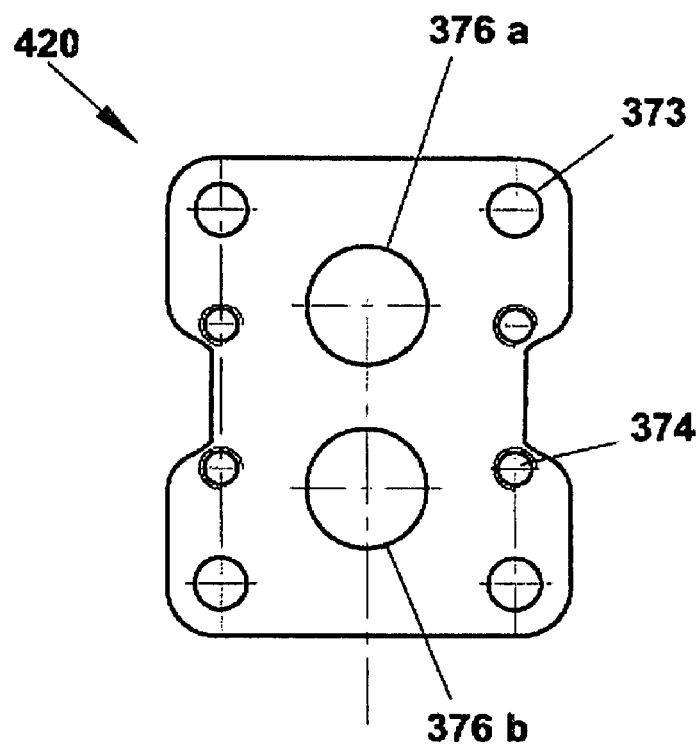
FIG. 17D is the view of the lower cover of the transducer (400).

FIG. 17D is a top view of the inferior cover (420) of the transducer(400). The cover's geometry (420) follows the outline of the body (410). It can be noticed the pressure plugs (376a, 376b) and holes (373) and (374) respectively for the fixing services in the mandrel and connection of the body to the cover (410) (420).

It is forecasted three Bragg's network (118a, 118b, 118c) in the transducer (400), all of them over just a surface of the diaphragm (2), being this surface determined according to the position of the hole (412). This is due to the presence of three figures that must me monitored: differential pressure, temperature and average pressure. The positioning of the Bragg's network (118a, 118b, 118c), shown in FIG. 17B, is determined based on calculations. The first network (118a) is fixed in the neutral zone, the second one (118b) in the central zone and the third one (118c) is in the intermediary position between the central region and the nearest neutral zone, being the zone referred to the diaphragm (2).

It must be clear for the experts that despite the invention has been described in connection to the differential transducers based on optics fiber with Bragg networks for use at the bottom of wells, these transducers may be equally used whenever it is required to measure the differential pressure in a Venturini for the flow measurement inside an oil well.

The invention claimed is:

1. A fiber optics differential pressure transducer to measure the differential pressure generated by a Venturi type device in oil wells, characterized by comprising:
   a) a main body (110) provided with:
      a hollow hole (113);
      on a symmetrical manner to said hole (113), a depression (112) on both sides of said body (110), the depression (112) being provided in the middle of a diaphragm (2) to be attached to at least one FBG, said body (110) being connected to:
   b) a cap (115), provided with a depression (117) with matching ends and of the same dimension as the hollow hole (113) and the depression (112), and a groove (116) to: i) house the mechanical seal for sealing the upper portion of said transducer and ii) communicate said hollow hole (113) to one of the surfaces of the diaphragm (2) submitted to the action of pressure, the other surface of the diaphragm (2) being in contact with a pressure outlet, the body (110) and the cap (115) being assembled and attached to a mandrel from a pipe with the help of attachment devices through the orifices (120), and where:
      the optical fiber (118) containing at least one FBG (118a) runs through the holes (111a, 111b) in the body of the transducer in such a manner that said FBG is exactly over the central part of the surfaces of the diaphragm (2), the route of the fiber comprising the entry through a hole (111a/111b) in one of the sides of the body (110) of the transducer, passes through the diaphragm (2), follows on until the hollow hole (113), circles said hole in a spiral made in the walls of the body (110); and enters the body (110) once again in the direction of the other surface of the diaphragm (2) and finally leave the body (110), to be connected to another transducer or to the measuring system.

2. Transducer in accordance with claim 1, characterized that, in the body (110), a channel (114) in spiral is positioned in the hollow hole (113) to communicate the holes (111a, 111*b*) allowing the protection and passage of the optical fiber from one surface to another of the diaphragm (2).

3. Transducer in accordance with claim 1, characterized that the geometry of the cap (115) is such that it not only seals the upper part of said transducer, but it also communicates with the hollow hole (113) of the body (110) to one of the surfaces of the diaphragm (2) where the pressure acts upon, the other surface of the diaphragm (2) being in contact with the other pressure outlet.

4. Transducer in accordance with claim 1, characterized that the diaphragm (2) is positioned in parallel to the body (110).

5. A fiber optics differential pressure transducer to measure the differential pressure generated by a Venturi type device in an oil well, characterized by comprising:
- a) upper cap (220), provided with a pin (221) intended to equalize the volume of chambers C1 and C2, and channel (222) for sealing O-Ring;
- b) body (230), which comprises:
  - lower face (231) containing a first chamber C1 in whole, and part of a second chamber C2, housings (232) for mechanical seals (201) and communication hole (233) between the upper (not represented) and lower (231) faces corresponding to the second chamber C2;
  - upper face (241) which comprises the hole (233) for communication between the channel (243) and the upper face of the diaphragm (2) opposite to the first chamber C1, said hole (233), the channel (243) and upper face being part of said second chamber C2;
  and where the central region of said body (230) is provided with two longitudinal passing holes (234, 235), located vertically one in relation to the other, said holes (234, 235) being intended for inserting the optical fiber (118) containing Bragg networks (118*a*, 118*b*) to position said networks ion each of the surfaces of the diaphragm (2);
  - a channel (236) in the longitudinal face of the body (230) intended to contain/protect the optical fiber (118) in the passage of the same from one lateral face to the other lateral face of said body (230);
- c) lower cap (250) presenting two holes (251*a*, 251*b*) for the pressure outlets;
- d) flexible mechanical seals (201) to transmit the pressure up to the surfaces of the diaphragm (2), the seals (201) being placed in the respective housings (232) in the lower face (231) of the body (230), said seals being pressed by the lower cap (250) to provide the sealing of chambers C1 and C2.

6. Transducer in accordance with claim 5, characterized that chamber C1 is formed by the volume of the depression (237) made on the lower surface (231) of the body (230) of the transducer (200) and the surface of the diaphragm (2).

7. Transducer in accordance with claim 5, characterized that chamber C2 is formed by the volumes corresponding to the depression (238) on the lower surface (231) of the body (230) of the transducer, the hole (233), the channel (243) on the upper surface (241) and the depression (239) made on the upper surface (241) of the body (230) of the transducer opposite the diaphragm (2).

8. Transducer in accordance with claim 5, characterized that both the volumes of chambers C1 and C2 are equal.

9. Transducer in accordance with claim 8, characterized that the pin (221) inside the depression (239) on the upper part (241) of the body (230) of the transducer is intended to equalize the volumes of Chambers C1 e C2.

10. Transducer in accordance with claim 5, characterized that the diaphragm (2) is placed in parallel to the body (230).

11. Transducer in accordance with claim 5, characterized that the body (230) is provided further with holes (271) for attachment devices on mandrel of a pipe and (272) for attachment devices for assembly to said transducer.

12. Transducer in accordance with claim 5, characterized that the passing hole (234) presents a 7° slope in relation to the longitudinal axis from the end of the diaphragm (2).

13. Transducer in accordance with claim 5, characterized that the seal (201) fits into a housing (232).

14. Transducer in accordance with claim 5, characterized that it additionally includes a communication hole (233) between the upper face (241) of the body (230) and chamber C2 which is found on the lower surface (231) of said body.

15. Transducer in accordance with claim 5, characterized that the lateral part of the body (230) is provided with a longitudinal channel (236) for protecting the optical fiber (118).

16. Transducer in accordance with claim 5, characterized that it additionally includes a longitudinal channel (236) for passing the optic fiber (118) by the lateral part of the body (230).

17. Transducer in accordance with claim 5, characterized that the channel (243) together with the hole (233) communicates the part of chamber C2 in the lower face (231) of the body (230) with the upper part of chamber C2 placed in the upper face of the diaphragm (2).

18. Transducer in accordance with claim 5, characterized that the upper cap (220) is provided with a groove (223) for the entry and/or exit of the optical fiber (118).

19. Transducer in accordance with claim 5, characterized that the lower cap (250) is provided with holes (251*a*, 251*b*) for the pressure outlets.

20. A fiber optics differential pressure transducer to measure the differential pressure generated by a Venturi type device in an oil well, characterized by comprising:
- a) upper cap (370), in the shape of a rectangular Box, provided with a hollow space (371) to fit with the lower part of a body (360) and a fissure (372) in the central part of the laterals intended for the passage of the optical fiber (118) entering or exiting the body (360);
- b) body (360), where:
  - the upper part of the same is provided with two rectangular depressions (361) for adapting the upper cap (370) on said body (360) and with a transversal depression (362) on a semi-circular shape;
  - the lower part of the same is provided with depressions (366) for accommodating the mechanical seals (201) and channels (365) for sealing said mechanical seals;
  - the internal part of the same is provided with pressure chambers C1 and C2 separated by diaphragm (2), housings (364) for microvalves and communication channels (368*a*, 368*b*) between the housings (364) and the pressure chambers C1 and C2 and where orifices (369*a*, 369*b*) make the communication between each pressure chamber C1, C2 with the respective mechanical seal (201); and
- c) lower cap (375), provided with holes (376*a*, 376*b*) for the pressure outlet.

21. Transducer in accordance with claim 20, characterized that it additionally includes holes (373) for attachment devices on mandrel and holes (374) for attachment device for assembly of the transducer.

22. Transducer in accordance with claim 20, characterized that in the body (360) of the transducer (300) the fiber (118) enters by one of the orifices (363*a*/363*b*) in towards on of the surfaces of the diaphragm (2), the Bragg network is positioned in the center of one of the surfaces of said diaphragm, and continues the route until exiting on the opposite side where it entered, the fiber (118) going around the body (360) on any side and entering the body (360) once again by the free hole (363*a*/363*b*), positioning the Bragg network contained in the fiber (118) on the other surface of the diaphragm (2).

23. Transducer in accordance with claim 20, characterized that, additionally, the fiber (118) leaves the body (360) for connecting with an optical cable or another transducer with the same kind of technology.

24. Transducer in accordance with claim 20, characterized that the body (360) is comprised of a single part, with no union or joint, the diaphragm (2) being machined in the body itself (360).

25. Transducer in accordance with claim 20, characterized that the transversal depression (362) allows a radius of curvature in the optical fiber (118) so as to minimize the losses of the insertion of the same in the inlet and outlet of the optic fiber (118) by the holes (363*a*, 363*b*) which lead said fiber containing Bragg networks up to the surface of the diaphragm (2) where said networks are attached in the central part of each surface of the diaphragm (2).

26. Transducer in accordance with claim 20, characterized that the diaphragm (2) is located on a transversal manner in relation to the body (360).

27. Transducer in accordance with claim 20, characterized that the plug (310) provides the sealing for the pressure chambers C1 and C2.

28. Transducer in accordance with claim 20, characterized that a plug (320) provides the sealing of the housing (364) of the microvalves.

29. Transducer in accordance with claim 20, characterized that a plug (330) provides the sealing of the communication chambers (368*a*, 368*b*) between the housings (364) of the microvalves and the pressure chamber C1 and C2.

30. Transducer in accordance with claim 20, characterized that the optical fiber (118) contains two Bragg networks (118*a*, 118*b*) each one being attached on the central region of each of the surfaces of the diaphragm (2).

31. Transducer in accordance with claim 30, characterized that the networks (118*a*, 118*b*) are of different wavelengths so that, depending whether they are in traction or compression, the flow direction can be identified.

32. A fiber optics differential pressure transducer to measure the differential pressure generated by a Venturi type device in oil wells, characterized by comprising:

a) body (410) provided with:
   transversal depression (411) containing a single hole (412) for passing the optical fiber (118) containing the Bragg networks up to the diaphragm (2);
   housing (413*a*, 413*b*) for sealing washer; and housings (414*a*, 414*b*) for the attachment device of washers intended for sealing the pressure chambers C1 and C2;
   housings (364) for microvalves; and
b) lower cap (420), with geometry that follows the outline of the body (410), the cap (420) being provided with pressure outlets (376*a*, 376*b*).

33. Transducer in accordance with claim 32, characterized that it additionally includes in the lower cap (420) holes (373) and (374) respectively for attachment devices on the mandrel and connection of the body (410) to the cap (420).

34. Transducer in accordance with claim 32, characterized that the body (410) includes three Bragg networks (118*a*, 118*b*, 118*c*), all only on the surface of the diaphragm (2), this surface being determined by the position of the hole (412).

35. Transducer in accordance with claim 32, characterized that the positioning of the Bragg networks (118*a*, 118*b*, 118*c*), is determined on a calculation basis, the first network (118*a*) being attached to the neutral zone, the second (118*b*) in the central region and the third (118*c*) in a intermediate position between the central region and the next neutral zone, the zones being referred to the diaphragm (2).

* * * * *